US012700530B2

(12) United States Patent (10) Patent No.: US 12,700,530 B2
Labombard et al. (45) Date of Patent: Aug. 4, 2026

(54) PASSIVE QUENCH PROTECTION TECHNIQUES FOR NON-INSULATED SUPERCONDUCTING MAGNETS

(71) Applicants: Massachusetts Institute of Technology, Cambridge, MA (US); Commonwealth Fusion Systems LLC, Cambridge, MA (US)

(72) Inventors: Brian Labombard, Belmont, MA (US); Krishna Kiran Kumar Uppalapati, North Billerica, MA (US)

(73) Assignees: Massachusetts Institute of Technology, Cambridge, MA (US); Commonwealth Fusion Systems LLC, Devens, MA (US)

( * ) Notice: Subject to any disclaimer, the term of this patent is extended or adjusted under 35 U.S.C. 154(b) by 791 days.

(21) Appl. No.: 17/913,609

(22) PCT Filed: Mar. 25, 2021

(86) PCT No.: PCT/US2021/024079
§ 371 (c)(1),
(2) Date: Sep. 22, 2022

(87) PCT Pub. No.: WO2021/195330
PCT Pub. Date: Sep. 30, 2021

(65) Prior Publication Data
US 2023/0146164 A1 May 11, 2023

Related U.S. Application Data

(60) Provisional application No. 63/000,381, filed on Mar. 26, 2020.

(51) Int. Cl.
H01F 6/06 (2006.01)
H01F 6/04 (2006.01)
(Continued)

(52) U.S. Cl.
CPC ................. H01F 6/06 (2013.01); H01F 6/04 (2013.01); B23K 35/262 (2013.01);
(Continued)

(58) Field of Classification Search
CPC ........................................................ H01F 6/04
See application file for complete search history.

(56) References Cited

U.S. PATENT DOCUMENTS

| 1,955,318 A | 4/1934 | West |
| 2,982,889 A | 5/1961 | Whearley |
| (Continued) | | |

FOREIGN PATENT DOCUMENTS

| CA | 2 304 633 | 4/1998 |
| CA | 2 374 326 A1 | 1/2001 |
| (Continued) | | |

OTHER PUBLICATIONS

Alam "Development of high strength Sn—Cu solder using copper particles at nanolength scale" Journal of Alloys and Compounds 476 (2009) 199-206. (Year: 2009).*
(Continued)

*Primary Examiner* — Paul A Wartalowicz
(74) *Attorney, Agent, or Firm* — Daly, Crowley, Mofford & Durkee, LLP

(57) ABSTRACT

According to some aspects, techniques are described for designing non-insulated (NI) high temperature superconductor (HTS) magnets that mitigate problems that may arise during quench initiation and propagation. Coupling the HTS material to a co-conductor along its length reduces the effective resistance of the conductive path along the HTS material when it is not superconducting, and that this leads to numerous advantages for quench mitigation.

16 Claims, 17 Drawing Sheets

1000

(51) Int. Cl.
    *B23K 35/26*        (2006.01)
    *C22C 11/00*        (2006.01)
    *C22C 13/00*        (2006.01)
(52) U.S. Cl.
    CPC ............ *B23K 35/268* (2013.01); *C22C 11/00*
              (2013.01); *C22C 13/00* (2013.01)

(56) References Cited

U.S. PATENT DOCUMENTS

| | | |
|---|---|---|
| 3,210,610 A | 10/1965 | Fraser |
| 3,281,738 A | 10/1966 | Hanak |
| 3,293,008 A | 12/1966 | Allen et al. |
| 3,416,111 A | 12/1968 | Bogner |
| 3,428,925 A | 2/1969 | Bogner et al. |
| 3,686,422 A | 8/1972 | Doose |
| 3,768,417 A | 10/1973 | Thornton et al. |
| 3,842,751 A | 10/1974 | Thornton et al. |
| 3,919,677 A | 11/1975 | Young |
| 3,983,521 A | 9/1976 | Furuto et al. |
| 4,135,294 A | 1/1979 | Brown |
| 4,218,668 A | 8/1980 | Tada et al. |
| 4,344,807 A | 8/1982 | Dennesen et al. |
| 4,377,905 A | 3/1983 | Agatsuma et al. |
| 4,568,900 A | 2/1986 | Agatsuma et al. |
| 4,586,012 A | 4/1986 | Koizumi et al. |
| 4,808,954 A | 2/1989 | Ito |
| 4,994,633 A | 2/1991 | Puhn |
| 5,057,489 A | 10/1991 | Ohkawa et al. |
| 5,105,177 A | 4/1992 | Tada et al. |
| 5,122,772 A | 6/1992 | Shimamoto et al. |
| 5,173,678 A | 12/1992 | Bellows et al. |
| 5,231,078 A | 7/1993 | Riebman |
| 5,331,800 A | 7/1994 | Schaumburg et al. |
| 5,426,408 A | 6/1995 | Jones et al. |
| 5,581,220 A | 12/1996 | Rodenbush et al. |
| 5,719,106 A | 2/1998 | Mukai et al. |
| 5,902,774 A | 5/1999 | Muranaka et al. |
| 5,914,647 A | 6/1999 | Aized et al. |
| 6,128,174 A | 10/2000 | Ritter et al. |
| 6,194,985 B1 | 2/2001 | Tanaka et al. |
| 6,231,078 B1 | 5/2001 | Kokeguchi |
| 6,271,474 B1 | 8/2001 | Fujikami et al. |
| 6,472,966 B1 | 10/2002 | Ehrhart |
| 6,576,843 B1 | 6/2003 | Ashworth |
| 6,601,289 B1 | 8/2003 | Kobayashi |
| 8,344,843 B2 | 1/2013 | Larsen |
| 8,437,819 B2 | 5/2013 | Takayasu et al. |
| 8,478,374 B2 | 7/2013 | Maguire et al. |
| 9,117,578 B2 | 8/2015 | Hahn et al. |
| 9,183,970 B2 | 11/2015 | Maeda et al. |
| 9,324,486 B2 | 4/2016 | Hahn et al. |
| 9,697,930 B2 | 7/2017 | Takemoto |
| 10,062,485 B2 | 8/2018 | Iwasa et al. |
| 10,079,092 B2 | 9/2018 | Iwasa et al. |
| 10,319,500 B2 | 6/2019 | Ko et al. |
| 10,332,640 B2 | 6/2019 | Sykes et al. |
| 10,804,018 B2 | 10/2020 | Hahn et al. |
| 10,861,626 B2 | 12/2020 | Kim et al. |
| 11,094,439 B2 | 8/2021 | Labombard et al. |
| 11,101,059 B2 | 8/2021 | Slade et al. |
| 11,190,006 B2 | 11/2021 | Noonan et al. |
| 11,417,464 B2 | 8/2022 | Labombard et al. |
| 11,557,893 B2 | 1/2023 | Ross et al. |
| 11,659,776 B2 | 5/2023 | Ha et al. |
| 11,749,434 B2 | 9/2023 | Slade et al. |
| 11,776,721 B2 | 10/2023 | Slade |
| 2005/0127928 A1 | 6/2005 | Kirby |
| 2006/0071747 A1 | 4/2006 | Friedman et al. |
| 2006/0077025 A1 | 4/2006 | Funaki et al. |
| 2009/0194316 A1 | 8/2009 | Thomas et al. |
| 2011/0143247 A1 | 6/2011 | An et al. |
| 2012/0214674 A1 | 8/2012 | Blakes et al. |
| 2013/0255991 A1 | 10/2013 | Snitchler et al. |
| 2014/0211900 A1 | 7/2014 | Kingham et al. |
| 2014/0302997 A1 | 10/2014 | Takayasu |
| 2014/0312999 A1 | 10/2014 | Oomen |
| 2015/0123760 A1 | 5/2015 | Meinke |
| 2015/0263259 A1 | 9/2015 | Welp et al. |
| 2016/0155541 A1 | 6/2016 | Jenner et al. |
| 2016/0156174 A1 | 6/2016 | Kirby et al. |
| 2016/0232988 A1 | 8/2016 | Sykes et al. |
| 2017/0179364 A1 | 6/2017 | Schwartz et al. |
| 2017/0221609 A1 | 8/2017 | Kurihara |
| 2017/0338009 A1 | 11/2017 | Van Der Laan |
| 2018/0158586 A1 | 6/2018 | Meinke et al. |
| 2018/0164388 A1 | 6/2018 | Guenter et al. |
| 2018/0248357 A1 | 8/2018 | Ross et al. |
| 2018/0261753 A1 | 9/2018 | Wilson et al. |
| 2019/0172612 A1 | 6/2019 | Ohsugi |
| 2019/0385771 A1 | 12/2019 | Painter |
| 2020/0111589 A1 | 4/2020 | Yamaguchi et al. |
| 2020/0169158 A1 | 5/2020 | Buhrer et al. |
| 2020/0194153 A1 | 6/2020 | Brunner |
| 2020/0211744 A1 | 7/2020 | Labombard et al. |
| 2020/0279681 A1 | 9/2020 | Radovinsky et al. |
| 2020/0365304 A1 | 11/2020 | Slade et al. |
| 2020/0381155 A1 | 12/2020 | Slade |
| 2021/0159383 A1* | 5/2021 | Wilson ................. H10N 60/203 |
| 2021/0350957 A1 | 11/2021 | Takayasu et al. |
| 2021/0407716 A1 | 12/2021 | Radovinsky et al. |
| 2022/0013256 A1 | 1/2022 | Hubbard et al. |
| 2022/0068528 A1 | 3/2022 | Brunner |
| 2022/0336130 A1 | 10/2022 | Labombard et al. |
| 2023/0101820 A1 | 3/2023 | Radovinsky et al. |

FOREIGN PATENT DOCUMENTS

| | | |
|---|---|---|
| CN | 102867601 A | 1/2013 |
| CN | 103035354 A | 4/2013 |
| CN | 103794297 | 5/2014 |
| CN | 106 298 149 A | 1/2017 |
| CN | 109 102 987 A | 12/2018 |
| EP | 0 504 896 A1 | 9/1992 |
| EP | 0667627 | 11/1998 |
| EP | 3 499 519 | 6/2019 |
| GB | 2578307 A | 5/2020 |
| GB | 2600110 | 4/2022 |
| JP | S 54-60476 A | 5/1979 |
| JP | S54106864 | 8/1979 |
| JP | S55125601 | 9/1980 |
| JP | S55125601 W | 9/1980 |
| JP | S57108314 | 7/1982 |
| JP | S 58-40803 A | 3/1983 |
| JP | 61-159711 | 7/1986 |
| JP | S61159711 | 7/1986 |
| JP | S63293801 | 11/1988 |
| JP | S 64-39008 A | 2/1989 |
| JP | H 06-243745 A | 9/1994 |
| JP | 08-055526 | 2/1996 |
| JP | H08138927 | 5/1996 |
| JP | H08138927 A | 5/1996 |
| JP | H08191538 A | 7/1996 |
| JP | H 02873924 | 10/1996 |
| JP | H08273924 A | 10/1996 |
| JP | 09027416 | 1/1997 |
| JP | H 11-3814 A | 1/1999 |
| JP | H 11-43308 A | 2/1999 |
| JP | H11135320 | 5/1999 |
| JP | H11135320 A | 5/1999 |
| JP | 2000277322 A | 6/2000 |
| JP | 2003 007526 A | 1/2003 |
| JP | 2003112097 | 4/2003 |
| JP | 2004527431 | 9/2004 |
| JP | 2006-196720 A | 7/2006 |
| JP | 2006196720 | 7/2006 |
| JP | 2008041966 A | 2/2008 |
| JP | 2008244280 | 10/2008 |
| JP | 2008244280 A | 10/2008 |
| JP | 2009-170550 A | 7/2009 |
| JP | 2009188366 | 8/2009 |
| JP | 2010181797 | 8/2010 |
| JP | 2011-228065 A | 11/2011 |
| JP | 2012-195413 A | 10/2012 |
| JP | 2013-080849 | 5/2013 |

(56) References Cited

FOREIGN PATENT DOCUMENTS

| JP | 2015-012182 A | 1/2015 |
|----|----|----|
| JP | 2017-63083 A | 3/2017 |
| JP | 6180729 | 8/2017 |
| JP | 2017175031 | 9/2017 |
| JP | 2019102298 | 6/2019 |
| KR | 10-0717351 B1 | 5/2007 |
| KR | 10-1637468 | 7/2016 |
| WO | WO 01/06524 | 1/2001 |
| WO | WO 2008/011184 | 1/2008 |
| WO | WO 2010/042259 | 4/2010 |
| WO | WO 2011/074092 A1 | 6/2011 |
| WO | WO 2014/201242 A1 | 12/2014 |
| WO | WO 2017/042543 A1 | 3/2017 |
| WO | WO 2020/139832 | 7/2020 |
| WO | WO 2021/055037 A2 | 3/2021 |
| WO | WO 2021/055037 A3 | 3/2021 |
| WO | WO 2021/178697 | 9/2021 |
| WO | WO 2021/195330 | 9/2021 |
| WO | WO 2021/195330 53 | 9/2021 |
| WO | WO 2021/195383 | 9/2021 |
| WO | WO 2021/195383 47 | 9/2021 |
| WO | WO 2021/236185 | 11/2021 |
| WO | WO 2021/236901 | 11/2021 |
| WO | WO 2021/252330 | 12/2021 |
| WO | WO 2021/262319 | 12/2021 |
| WO | WO 2022/019989 | 1/2022 |
| WO | PCT/US2022/030047 | 5/2022 |
| WO | PCT/US2022/049876 | 11/2022 |
| WO | WO 2023234913 | 12/2023 |

OTHER PUBLICATIONS

PCT International Search Report and Written Opinion dated Mar. 11, 2024 for International Patent Application No. PCT/US2023/081450; 23 pages.

Examiners Answer dated Apr. 16, 2025 for U.S. Appl. No. 17/281,828; 8 Pages.

U.S. Notice of Allowance dated Aug. 28, 2024 for U.S. Appl. No. 18/476,886; 8 Pages.

Response (with English Translation) to Korean Office Action dated Mar. 22, 2024 for Korean Application No. 10-2023-7020578; Response Filed Jul. 19, 2024; 16 Pages.

U.S. Pre-Appeal Brief Request filed on Jan. 3, 2025 for U.S. Appl. No. 17/281,828; 3 Pages.

U.S. 3$^{rd}$ Notice of Allowance dated Jan. 2, 2025 for U.S. Appl. No. 18/476,886; 8 Pages.

European Intention to Grant (with Allowed Claims) dated Oct. 25, 2024 for European Application No. 19843007.6; 13 Pages.

Response to Final Office Action dated Jul. 5, 2024 for U.S. Appl. No. 17/281,828; Response Filed Nov. 5, 2024; 14 Pages.

Response to Japanese Office Action (with English translation) dated Dec. 3, 2024 for Japanese Patent Application No. 2024-064599; Response filed on Jan. 15, 2025; 15 pages.

Japanese Decision to Grant Patent (with English translation) dated Jan. 21, 2025 for Japanese Patent Application No. 2024-064599; 9 pages.

Korean Office Action (with English translation) dated Jan. 8, 2025 for Korean Patent Application No. 10-2022-7045023; 14 pages.

Response to Japanese Office Action (with English translation) dated Oct. 23, 2024 for Japanese Patent Application No. 2022-570130; Response filed Jan. 22, 2025; 21 pages.

Japanese Decision to Grant Patent (with English translation) dated Jan. 24, 2025 for Japanese Patent Application No. 2022-570130; 13 pages.

Japanese Office Action (with English machine translation) dated Jan. 30, 2025 for Japanese Patent Application No. 2022-557716; 10 pages.

Korean Office Action (with English translation) dated Jan. 2, 2025 for Korean Patent Application No 10-2022-7036137; 14 pages.

Korean Office Action (with English translation) dated Jan. 2, 2025 for Korean Patent Application No. 10-2022-7037032; 14 pages.

Xi et al., "Influence of External Magnetic Field on the Critical Current of a Novel HTS Square Wire"; 2018 IEEE International Conference on Applied Superconductivity and Electromagnetic Devices; Apr. 15-18, 2018; 2 pages.

Yanagi et al., "Feasibility of HTS Magnet Option for Fusion Reactors"; The Japan Society of Plasma Science and Nuclear Fusion Research; vol. 9; Aug. 2014; 6 pages.

Anwar et al.; "Direct Penetration of Spin-Triplet Superconductivity into a Ferromagnet in $Au/SrRuO_3/Sr_2RuO_4$ Junctions"; Nature Communications; 7:13220; Oct. 26, 2016; pp. 1-7; 7 Pages.

Bradford et al., "Controllable Critical Current Degradation of ReBCO CC by Post-Manufacturing Deoxygenation", Applied Superconductivity Center, Florida State University, Published Sep. 2019; 21 Pages.

Choi et al.; "A novel No. insulation winding technique of high temperature-superconducting racetrack coil for rotating applications: A progress report in Korea university"; Review of Scientific Instruments 87; 104704; American Institute of Physics; Oct. 7, 2016; 12 Pages.

Communication Pursuant to Rules 161(1) and 162 EPC for European Application No. 19843007.6 dated Aug. 3, 2021; 3 Pages.

Final Office Action dated Feb. 4, 2021 for U.S. Appl. No. 16/959,600; 15 Pages.

Final Office Action dated Oct. 25, 2019 for U.S. Appl. No. 15/710,895; 8 Pages.

Fangliang Dong et al.; "An on-board 2G HTS magnets system with cooling-power-free and persistent-current operation for ultrahigh speed superconducting maglevs"; Scientific Reports Nature Search, Aug. 19, 2019, 12 pages.

Hahn et al.; "No-insulation multi-width winding technique for high temperature superconducting magnet"; Applied Physics Letters 103, 173511; American Institute of Physics; Oct. 23, 2013; 3 Pages.

Hahn et al.; "HTS Pancake Coils Without Turn-to-Turn Insulation"; IEEE Transactions on Applied Superconductivity; vol. 21, No. 3; Jun. 2011; 4 Pages.

International Preliminary Report on Patentability dated Jul. 1, 2021 for International Application No. PCT/US2019/067116; 11 Pages.

International Preliminary Report on Patentability dated Jul. 8, 2021 for International Patent Application No. PCT/US2019/068332; 16 Pages.

Kim, et al.; "Investigation on quench initiation and propagation characteristics of GdBCO coil co-wound with a stainless-steel tape as turn-to-turn metallic insulation"; Review of Scientific Instruments 87; 114701; American Institute of Physics; Nov. 2, 2016; 6 Pages.

Li et al.; "Development of a Novel Soldered-Stacked-Square (3S) HTS Wire Using 2G Narrow Tapes With 1 mm Width"; IEEE Transactions on Applied Superconductivity; vol. 27, No. 4; Jun. 2017; 4 Pages.

Marchevsky; "Protection of Superconducting Magnet Circuits"; Lawrence Berkeley National Laboratory; USPAS 2017; http://uspas.fnal.gov/materials/17UCDavis/MachineProtection/uspas_mm.pdf; Part 1; 29 pages.

Marchevsky; "Protection of Superconducting Magnet Circuits"; Lawrence Berkeley National Laboratory; USPAS 2017; http://uspas.fnal.gov/materials/17UCDavis/MachineProtection/uspas_mm.pdf; Part 2; 30 pages.

Minervini, et al.; "Superconducting Magnets Research for a Viable US Fusion Program"; https://fire.pppl.gov/SC Magnet Research White Paper.pdf; Publication date unknown; Downloaded on Dec. 1, 2018; pp. 1-11; 11 Pages.

Notice of Allowance dated Jun. 30, 2017 for U.S. Appl. No. 15/090,847; 13 Pages.

Notice of Allowance dated Jul. 1, 2020 for U.S. Appl. No. 15/710,895; 9 Pages.

Notice of Allowance dated May 12, 2021 for U.S. Appl. No. 16/959,600; 10 Pages.

Notice of Allowance dated May 25, 2022 for U.S. Appl. No. 17/345,194; 4 Pages.

Office Action dated Jan. 26, 2017 for U.S. Appl. No. 15/090,847; 7 Pages.

(56) References Cited

OTHER PUBLICATIONS

Office Action dated Mar. 17, 2020 for U.S. Appl. No. 15/710,895; 9 pages.
Office Action dated Oct. 20, 2020 for U.S. Appl. No. 16/233,410; 20 Pages.
Office Action dated Oct. 20, 2020 for U.S. Appl. No. 16/416,781; 17 Pages.
Office Action dated Oct. 20, 2020 for U.S. Appl. No. 16/959,600; 16 Pages.
Office Action dated Oct. 26, 2021 for U.S. Appl. No. 17/345,194; 16 Pages.
Office Action dated Dec. 14, 2021 for U.S. Appl. No. 17/345,194; 11 Pages.
PCT International Search Report and Written Opinion dated Mar. 31, 2020 for International Application No. PCT/US2019/068332; 20 Pages.
PCT International Search Report and Written Opinion dated Jun. 9, 2021 for International Application No. PCT/US2021/018962; 17 Pages.
PCT International Search Report and Written Opinion dated Dec. 10, 2021 for International Application No. PCT/US2021/03349; 80 Pages.
PCT International Search Report and Written Opinion dated Jul. 15, 2021, for International Application No. PCT/US2021/024079; 33 Pages.
PCT International Search Report and Written Opinion dated Jan. 7, 2022 for International Application No. PCT/US2021/031699; 16 Pages.
Piec, et al.; "Development of a High-Field, Non-Insulated, High Temperature Superconducting Magnet for Fusion Research and Other Applications"; https://magneticsmag.com/development-of-a-high-field-non-insulated-high-temperature-superconducting-magnet-for-fusion-research-and-other-applications/; Apr. 29, 2020; 5 pages.
Response to Office Action dated Jan. 26, 2017 for U.S. Appl. No. 15/090,847 as filed on May 25, 2017; 6 Pages.
Response to Final Office Action dated Oct. 25, 2019 for U.S. Appl. No. 15/710,895 as filed on Jan. 27, 2020; 6 pages.
Response to Office Action dated Mar. 17, 2020 for U.S. Appl. No. 15/710,895 as filed on Jun. 17, 2020; 8 Pages.
Response to Office Action dated Oct. 20, 2020 for U.S. Appl. No. 16/959,600 as filed on Jan. 20, 2021; 13 Pages.
Response to Final Office Action dated Feb. 4, 2021 for U.S. Appl. No. 16/959,600, filed May 3, 2021; 10 Pages.
Response to Rule 161/162 Communication dated Aug. 3, 2021 for European Application No. 19843007.6; Response filed on Jan. 27, 2021; 7 Pages.
Response to Office Action dated Dec. 14, 2021 for U.S. Appl. No. 17/345,194 as filed on Mar. 7, 2022; 12 Pages.
Semba, et al.; "Design and Manufacture of Superconducting Magnet for the Wiggler in Saga-LS"; Proceedings of IPAC'10, Kyoto, Japan; MOPEBO38; May 23, 2010; pp. 358-360; 3 Pages.
Takayasu, et al.; "Conductor Characterization of YBCO Twisted Stacked-Tape Cables"; IEEE Transactions on Applied Superconductivity; vol. 23; No. 3; Jun. 2013; 4 Pages.
Xi, et al.; "Influence of External Magnetic Field on the Critical Current of a Novel HTS Square Wire"; Proceedings of 2018 IEEE International Conference on Applied Superconductivity and Electromagnetic Devices; Apr. 2018; 2 Pages.
Yanagi, et al.; "Feasibility of HTS Magnet Option for Fusion Reactors"; Plasma and Fusion Research: Regular Articles; vol. 9; Jan. 2014; 6 Pages.
Yanagi, et al.; "Progress of the Design of HTS Magnet Option and R&D Activities for the Helical Fusion Reactor"; IEEE Transactions on Applied Superconductivity; vol. 24; No. 3; Jun. 2014; 5 Pages.
Yazaki et al. "Critical Current Degradation in High-Temperature Superconducting Tapes Caused by Temperature Rise", IEEE Transaction on Applied Superconductivity, vol. 23, No. 3, Published Jun. 2013; 4 Pages.
European Examination Report dated May 14, 2024 for European Application No. 21719774.8, 9 pages.

Notice of Allowance dated May 23, 2024 for U.S. Appl. No. 18/476,886, 9 pages.
Intention of grant dated May 24, 2024 for European Application No. 19843007.6, 10 pages.
PCT International Search Report and Written Opinion dated Jun. 5, 2024 for International Patent Application No. PCT/US2024/013492; 14 pages.
Office Action dated Dec. 13, 2023 for U.S. Appl. No. 17/281,828, 10 pages.
Response to Office Action dated Dec. 13, 2023, filed on Jun. 11, 2024 for U.S. Appl. No. 17/281,828, 11 pages.
U.S. Appl. No. 17/810,038, filed Jun. 30, 2022, Labombard et al.
U.S. Appl. No. 17/796,762, filed Aug. 1, 2022, Labombard et al.
U.S. Appl. No. 17/796,481, filed Jul. 29, 2022, Radovinsky, et al.
U.S. Appl. No. 17/919,606, filed Oct. 18, 2022, Radovinsky, et al.
U.S. Appl. No. 17/919,942, filed Oct. 19, 2022, Labombard, et al.
U.S. Appl. No. 18/008,279, filed Dec. 5, 2022, Radovinsky, et al.
Green, et al.; "The ITER Project: Status and Prospects"; IEEE Transactions on Magnetics; vol. 32; No. 4; Jul. 1996; 6 Pages.
Chen, et al.; "Development of a Digital Quench Detection and Dumping Circuit With Constant Voltage System for SMES"; IEEE Transactions on Applied Superconductivity; vol. 20, No. 3; Jun. 2010; 4 Pages.
Alfaro, et al.; "Vacuum Assisted Liquified Metal (VALM) TSV Filling Method with Superconductive Material"; MEMS 2018; Jan. 21-25, 2018; 4 Pages.
Barth, et al.; "Electro-mechanical properties of REBCO coated conductors from various industrial manufacturers at 77K, self-field and 4.2K, 19T"; Superconductor Science and Technology; Feb. 13, 2015; 11 Pages.
Bauer, et al.; "Review of material properties, past experiences, procedures, issues and results for a possible solder filled cable as Plan B conductor for the EFDA dipole magnet (Draft Vs 1)"; EFDA CSU report LRP 830/07; May 2007; 29 Pages.
Bauer, et al.; "Solder-Filling of A CICC Cable for the EFDA Dipole Magnet"; AIP Conference Proceedings 986, 151; Jan. 2008; 9 Pages.
Bauer; "Development of HTS Current Leads for the ITER Project"; ITER Technical Report, Report No. ITR-18-001; Feb. 28, 2018; 47 Pages.
Bruzzone; "Selected Results of Conductor R&D from the SULTAN Test Facility"; Progress in Electromagnetic Research Symposium 2004; Pisa, Italy; Mar. 28-31, 2004; 4 Pages.
Celentano, et al.; "Design of an Industrially Feasible Twisted-Stack HTS Cable-in-Conduit Conductor for Fusion Application"; IEEE Transactions on Applied Superconductivity; vol. 23; No. 3; Jul. 2014; 5 Pages.
Collings, et al.; "Bi:2212/Ag-based Rutherford cables: production, processing and properties"; Superconductor Science and Technology; vol. 12; No. 2; Feb. 1, 1999; 3 Pages.
Dietderich, et al.; "Critical Current Variation as a Function of Transverse Stress of Bi-2212 Rutherford Cables"; IEEE Transactions on Applied Superconductivity; vol. 11; No. 1; Mar. 2001; 3 Pages.
Japanese Request of Examination and Voluntary Amendment with amended claims (with English translation) dated Dec. 15, 2022 for Japanese Application No. 2021-534337; 10 Pages.
Fietz, et al.; "High Current HTS Cables—Status and Actual Development"; IEEE/CSC & ESAS Superconductivity News Forum (global edition); Oct. 18-23, 2015; 43 Pages.
Goldacker, et al.; "Roebel cables from REBCO coated conductors: a one-century-old concept for the superconductivity of the future"; Superconductor Science and Technology; Aug. 13, 2014; 17 Pages.
Goldacker, et al.; Improvement of Superconducting properties in ROEBEL Assembled Coated Conductors (RACC); IEEE Transactions on Applied Superconductivity; vol. 19; No. 3; Jun. 2009; 4 Pages.
Indium Corporation; Data sheet 5RMA-RC and 5RA-RC; Jan. 2019; 8 Pages.
Kario, et al. "Investigation of a Rutherford Cable Using Coasted Conductor Roebel Cables as Strands"; Superconductor Science Technology 26 (2013) 085019 (6pp); http://iopscience.iop.org/0953-2048/26/8/085019; Published on Jul. 4, 2013; 7 Pages.

(56) References Cited

OTHER PUBLICATIONS

Li, et al.; "Feasibility Study of the Impregnation of a No-Insulation HTS Coil Using Solder"; IEEE Transactions on Applied Superconductivity; vol. 28, No. 1; Jan. 2018; 5 Pages.

Liao, et al.; "Signal De-Noising of Quench Detection by Real-Time Wavelet Analysis Algorithm for HTS Coil and Magnet"; IEEE Transactions on Applied Superconductivity; vol. 27, No. 4; Jun. 2017; 5 Pages.

Mei, et al.; "Effects of Cooling Rate on Mechanical Properties of Near-Eutectic Tin-Lead Solder Joints"; Journal of Electronic Materials; vol. 20, No. 8; Feb. 15, 1991; 10 Pages.

Mogro-Campero, et al.; "Degradation of Thin Films of YBa2Cu307 by Annealing in Air and in Vacuum"; Journal of Superconductivity; vol. 8; No. 1; Jan. 1995; 4 Pages.

Markiewicz, et al.; "900 MHz Wide Bore NMR Spectrometer Magnet at Nhmfl"; IEEE Transactions on Applied Superconductivity; vol. 10, No. 1; Mar. 2000; 4 Pages.

Nishijima et al., "Mechanical and Transport Characteristic Exploration for Coated Conductors by Hoop Stress Tests;" Physica C.; May 18, 2011; vol. 471, No. 21; 5 Pages.

Office Action dated Aug. 17, 2022 for U.S. Appl. No. 17/291, 120; 7 Pages.

Patil, et al.; "Causes of Casting Defects with Remedies"; International Journal of Engineering Research & Technology (IJERT); vol. 4, Issue 11; Nov. 2015; 6 Pages.

PCT International Search Report and Written Opinion of the ISA dated Jun. 25, 2021 for International Application No. PCT/US2021/020916; 15 Pages.

PCT International Preliminary Report on Patentability dated May 27, 2022 for International Application No. PCT/US2020/060170; 12 Pages.

PCT International Preliminary Report on Patentability dated Sep. 15, 2022 for International Application No. PCT/US2021/020916; 8 Pages.

PCT International Search Report and Written Opinion dated Jun. 25, 2021 for International Application No. PCT/US2021/024160; 14 Pages.

PCT International Preliminary Report on Patentability dated Oct. 6, 2022 for International Application No. PCT/US2021/024160; 8 Pages.

PCT International Search Report and Written Opinion dated Feb. 1, 2022 for International Application No. PCT/US2021/30207; 13 Pages.

PCT International Preliminary Report On Patentability dated Nov. 17, 2022 for International Application No. PCT/US2021/030207; 10 Pages.

PCT International Preliminary Report dated Mar. 25, 2021 for International Application No. PCT/US2021/024079; 11 Pages.

International Preliminary Report on Patentability dated Jan. 5, 2023 for International Application No. PCT/US2021/031699; 10 Pages.

PCT International Preliminary Report on Patentability dated Dec. 1, 2022 for International Application No. PCT/US2021/018962; 11 Pages.

International Search Report and Written Opinion of the ISA dated Jan. 26, 2022 for International Application No. PCT/US2021/020225; 15 Pages.

International Patent Cooperation Treaty PCT Third Party Observation dated Jul. 7, 2022 for International Application No. PCT/US2021/020225; 4 Pages.

International Communication in Cases for Which No Other Form Is Applicable dated Jul. 7, 2022 for International Application No. PCT/US2021/020225; NPL References; 15 Pages.

Pierro, et al.; "Finite element investigation of the mechanical behaviour of a Twisted Stacked-Tape Cable exposed to large Lorentz loads"; IOP Conf. Series: Material Science and Engineering 279; Jan. 2017; 9 Pages.

Prasad, et al.; "Fabrication of New Joints for SST-1 TF Coil Winding Packs"; Fusion Engineering and Design; www.elsevier.com/locate/fusengdes; Jun. 2013; 5 Pages.

Preuss, et al.; "Critical Current Degradation of Coated Conductors Under Soldering Conditions"; IEEE Transactions on Applied Superconductivity; vol. 28; No. 4; Jun. 2018; 5 Pages.

Restriction Requirement dated Jun. 15, 2022 for U.S. Appl. No. 17/291,120; 7 Pages.

Response to Restriction Requirement dated Jun. 15, 2022 for U.S. Appl. No. 17/291,120 as filed on Aug. 1, 2022; 1 Page.

Response to Office Action dated Aug. 17, 2022 for U.S. Appl. No. 17/291,120 as filed on Nov. 17, 2022; 16 Pages.

Search Report and Written Opinion of the ISA for International Application No. PCT/US2020/060170 dated Feb. 16, 2021; 20 Pages.

Sumption, et al.; "Measurements of RRR Variation in Strands Extracted from Nb3Sn-Type Rutherford Cables"; AIP Conference Proceedings 986,277; Mar. 4, 2008; 10 Pages.

Ta, et al.; "Comparison study of cable geometries and superconducting tape layouts for high-temperature superconductor cables"; Cryogenics; Mar. 1, 2018; 7 Pages.

Takayasu, et al.; "Present Status and Recent Developments of the Twisted Stacked-Tape Cable Conductor"; IEEE Transactions on Applied Superconductivity; vol. 26; No. 2; Mar. 2016; 10 Pages.

Tsui, et al.; "Soldered Joints—An Essential Component of Demountable High Temperature Superconducting Fusion Magnets"; IOP Publishing, Superconductor Science and Technology; vol. 29, Jan. 2016; 16 Pages.

Uglietti; "A review of commercial high temperature superconducting material for large magnets: from wires and tapes to cables and conductors"; Superconductor Science and Technology; Jan. 2019; 30 Pages.

Uglietti, et al.; "Critical currents versus applied strain for industrial Y-123 coated conductors at various temperatures and magnetic fields up to 19 T", Supercond. Sci. Technol. 19; pp. 869-872; Jul. 5, 2006; 5 Pages.

Van der Laan, et al.; Characterization of a high-temperature superconducting conductor on round core cables in magnetic fields up tp 20 T; Superconductor Science and Technology 26; Feb. 13, 2013; 10 Pages.

Whyte, et al.; "Smaller & Sooner: Exploiting High Magnetic Fields from New Superconductors for a More Attractive Fusion Energy Development Path"; J Fusion Energ (2016) 35:41-53; Jan. 22, 2016; 13 Pages.

Response to Non-Final Office Action dated Mar. 17, 2020 for U.S. Appl. No. 15/710,895, filed Jun. 17, 2020; 8 Pages.

U.S. Final Office Action dated Feb. 4, 2021 for U.S. Appl. No. 16/959,600; 15 Pages.

Response to U.S. Non-Final Office Action dated Dec. 14, 2021 for U.S. Appl. No. 17/345,194 as filed on Mar. 7, 2022; 12 Pages.

Response filed on May 2, 2023 for European Application No. 21719448.9; 28 Pages.

Korean Office Action dated Nov. 2, 2022 for Korean Application No. 10-2021-7021732; 16 Pages.

Korean Amendment with Pending Claims (with English Translation) dated Dec. 29, 2022 for Korean Application No. 10-2021-7021732; 65 Pages.

Korean Final Notice of Preliminary Rejection dated Jan. 10, 2023 for Korean Application No. 10-2021-7021732; 6 Pages.

Korean Notice of Allowance with Allowed Claims in English dated Mar. 21, 2023 for Korean Application No. 10-2021-7021732; 15 Pages.

Examination Report dated May 10, 2023 for European Application No. 19843007.6; 8 Pages.

Response filed on May 8, 2023 for European Application No. 21719774.8; 13 Pages.

Response filed on Jul. 2, 2023 for European Application No. 21732726.1; 11 Pages.

Notice of Allowance dated Jun. 30, 2023 for U.S. Appl. No. 17/810,038; 22 Pages.

Response (with Machine English Translation from Espacenet.com) to Japanese Office Action dated Dec. 8, 2023 for Japanese Application No. 2021-518071; Response filed Apr. 2, 2024; 7 Pages.

Korean Office Action (with English Translation) dated Mar. 22, 2024 for Korean Application No. 10-2023-7020578; 9 Pages.

(56)     References Cited

OTHER PUBLICATIONS

Reply Brief filed on Jun. 16, 2025 for U.S. Appl. No. 17/281,828; 5 Pages.
Prokopec et al., "Suitability of Coated Conductors for Fusion Magnets in View of Their Radiation Response;" Article from Superconductor Science and Technology, vol. 28, 014005; Published Dec. 9, 2014; 6 Pages.
European Examination Report dated Sep. 27, 2024 for European Application No. 19906952.7; 7 Pages.
Response to European Official Communication dated Aug. 12, 2024 for European Application No. 21732726.1; Response Filed Dec. 2, 2024; 19 Pages.
Extended European Search Report dated Dec. 4, 2024 for European Application No. 24200938.9; 10 Pages.
Japanese Office Action (with Machine English Translation) dated Nov. 28, 2024 for Japanese Application No. 2024-64599; 6 Pages.
PCT International Preliminary Report on Patentability dated Jun. 12, 2025 for International Application No. PCT/US2023/081450; 16 Pages.
PCT International Preliminary Report on Patentability dated Jun. 26, 2025 for International Application No. PCT/US2023/083812; 8 Pages.
PCT International Preliminary Report on Patentability dated Jun. 12, 2025 for International Application No. PCT/US2023/081302; 13 Pages.
Canadian Office Action dated Jan. 9, 2025 for Canadian Patent Application No. 3,122,318; 4 pages.
Korean Notice of Allowance (with English translation) dated Jan. 24, 2025 for Korean Patent Application No. 10-2023-7020578; 9 pages.
Japanese Office Action (with English translation) dated Jan. 22, 2025 for Japanese Patent Application No. 2022-579656; 11 pages.
Response to European Communication under Rule 71(3) dated Oct. 9, 2024 for European Patent Application No. 21719448.9; Response filed Feb. 7, 2025; 8 pages.
Canadian Voluntary Amendment filed Feb. 21, 2025 for Canadian Application No. 3,174,303; 6 Pages.
Response to European Communication Under Rule 71(3) dated May 24, 2024 for European Application No. 19843007.6; Response Filed Sep. 24, 2024; 13 Pages.
European Examination Report dated Oct. 18, 2024 for European Application No. 21811542.6; 9 Pages.
European Examination Report dated Aug. 12, 2024 for European Application No. 21732726.1; 5 Pages.
Japanese Examination Report (with Machine English Translation from Espacenet.com) dated Oct. 21, 2024 for Japanese Application No. 2022-570130; 12 Pages.
U.S. Restriction Requirement dated Sep. 23, 2024 for U.S. Appl. No. 17/919,606; 6 Pages.
Response to European Examination Report dated May 14, 2024 for European Application No. 21719774.8; Response Filed Sep. 12, 2024; 12 Pages.
European Intention to Grant dated Oct. 9, 2024 for European Application No. 21719448.9; 12 Pages.
European Examination Report Dated Nov. 27, 2023 for Application No. 21719448.9; 4 Pages.
Response to European Communication/Examination Report dated Nov. 27, 2023 for European Application No. 21719448.9; Response filed Mar. 25, 2024; 31 Pages.
Response to Examination Report dated Feb. 2, 2023 for European Application No. 21811542.6 as filed on Aug. 9, 2023; 15 Pages.
Response to Examination Report dated May 10, 2023 for European Application No. 19843007.6 as filed on Sep. 6, 2023; 24 Pages.
Japanese Response (with Machine Translation from Espacenet.com) to Office Action dated Oct. 18, 2023 for Japanese Application No. 2021-534337; Response filed Jan. 17, 2024; 16 Pages.
Japanese Notice of Allowance (with English Translation) dated Apr. 1, 2024 for Japanese Application No. 2021-534337; 9 Pages.

PCT International Search Report and Written Opinion dated Apr. 8, 2024 for International Application No. PCT/US2023/083812; 12 Pages.
U.S. Final Office Action dated Jul. 5, 2024 for U.S. Appl. No. 17/281,828; 15 Pages.
Duderstadt et al., *Nuclear Reactor Analysis*; pp. 105 and 106 from the Book; John Wiley & Sons, Inc.; Jan. 1976; 4 Pages.
International Search Report and Written Opinion dated Feb. 29, 2024 for International Patent Application No. PCT/US2023/081302; 19 pages.
P.V. Gade, "Conceptual Design of High Temperature Superconducting Toroidal Field Coils for Future Fusion Power Plants," Karlsruher Institute für Technologie, Jul. 25, 2019; 152 pages.
F. Mangiarotti, "Design of Demountable Toroidal Field Coils with REBCO Superconductors for a Fusion Reactor," Massachusetts Institute of Technology, Feb. 2016; 145 pages.
Response to European Official Communication dated Sep. 27, 2024 for European Application No. 19906952.7; Response Filed Mar. 26, 2025; 24 Pages.
U.S. Appeal Brief filed on Apr. 3, 2025 for U.S. Appl. No. 17/281,828; 39 Pages.
Response to Korean Office Action (with English Translation) dated Jan. 8, 2025 for Korean Application No. 10-2022-7045023, Response Filed Apr. 1, 2025, 60 Pages.
Response to Japanese Office Action (with English Translation of Claims) dated Jan. 17, 2025 for Japanese Application No. 2022-579656, Response Filed Apr. 17, 2025, 12 Pages.
Korean Office Action (with English Translation) dated Mar. 4, 2025 for Korean Application No. 10-2022-7043520; 18 Pages.
Response to Korean Office Action (with English Translation) dated Jan. 2, 2025 for Korean Application No. 10-2022-7036137, Response Filed Apr. 2, 2025, 34 Pages.
Korean Notice of Allowance (with English Translation) dated May 20, 2025 for Korean Application No. 10-2022-7036137, 5 Pages.
Response to Japanese Office Action (with English Translation) dated Jan. 30, 2025 for Japanese Application No. 2022-557716, Response Filed May 27, 2025, 10 Pages.
Canadian Exam Report dated May 26, 2025 for Canadian Application No. 3,173,407, 3 Pages.
European Intention to Grant dated Mar. 27, 2025 for European Application No. 21719448.9; 9 Pages.
Response to Korean Office Action (with English Translation) dated Jan. 2, 2025 for Korean Application No. 10-2022-7037032; Response Filed Apr. 2, 2025, 57 Pages.
Japanese Office Action (with English Translation) dated Apr. 23, 2025 for Japanese Application No. 2022-557713; 6 Pages.
Restriction Requirement dated May 22, 2025 for U.S. Appl. No. 17/919,942; 6 Pages.
Japanese Notice of Allowance (with English Translation) dated Jul. 2, 2025 for Japanese Application No. 2022-579656; 8 Pages.
Response to Japanese Office Action (with English Translation) dated Apr. 18, 2025 for Japanese Application No. 2022-557713, Response Filed Jul. 23, 2025, 17 Pages.
Non Final Office Action dated Aug. 7, 2025 for U.S. Appl. No. 17/919,606; 37 Pages.
Non Final Office Action dated Aug. 12, 2022 for U.S. Appl. No. 17/796,762; 42 Pages.
Non Final Office Action dated Aug. 7, 2025 for U.S. Appl. No. 17/919,942; 34 Pages.
Response to Restriction Requirement dated May 22, 2025 for U.S. Appl. No. 17/919,942 Response filed Jul. 28, 2025; 9 Pages.
Response filed Jan. 6, 2026, for European Application No. 23837033.2; 21 pages.
Response filed Sep. 24, 2024, for European Application No. 19843007.6; 10 pages.
Intention to Grant issued Oct. 25, 2024, for European Application No. 19843007.6; 10 pages.
Examination Report dated Nov. 25, 2025, for Canadian Application No. 3,122,318; 5 pages.
Response to Office Action dated Aug. 12, 2025, for U.S. Appl. No. 17/796,762; Response filed Dec. 12, 2025; 15 pages.
Communication Pursuant to Article 94(3) EPC dated Jan. 2, 2026, for European Application No. 21719774.8; 10 pages.

(56) References Cited

OTHER PUBLICATIONS

Response to Rules 161(1) and 162 EPC filed on Jan. 23, 2026, for European Application No. 23833278.7; 24 pages.

Response to Rules 161(1) EPC filed on Jan. 22, 2026, for European Application No. 23847922.4; 16 pages.

Aoki, et al.; "Effect of Neutron Irradiation on High-Temperature Superconductors"; IEEE Transactions on Applied Superconductivity; vol. 21; No. 3; pp. 3200-3202; Jun. 2011; 3 Pages.

Decision on Appeal dated Feb. 10, 2026 for U.S. Appl. No. 17/281,828; 6 Pages.

Examination Report dated Feb. 24, 2026 for Canadian Application No. 3,174,303; 7 Pages.

Office Action dated Mar. 19, 2026 for U.S. Appl. No. 17/919,942; 18 Pages.

Office Action dated Mar. 16, 2026 for U.S. Appl. No. 18/008,279; 10 Pages.

Response to the Communication under Rule 161(1) EPC for European Application No. 24709600.1 filed on Mar. 6, 2026; 30 pages.

Restriction Requirement dated May 15, 2024 for U.S. Appl. No. 17/358,261; 6 Pages.

Response to Restriction Requirement dated May 15, 2024 for U.S. Appl. No. 17/358,261 as filed on Jul. 15, 2024; 1 Page.

Office Action dated May 23, 2025 for U.S. Appl. No. 17/358,261; 23 Pages.

Response to Office Action dated May 23, 2025 for U.S. Appl. No. 17/358,261 as filed on Aug. 22, 2025; 11 Pages.

Final Office Action dated Oct. 31, 2025 for U.S. Appl. No. 17/358,261; 7 Pages.

Response to Final Office Action dated Oct. 31, 2025 for U.S. Appl. No. 17/358,261 as filed on Jan. 29, 2026; 13 Pages.

Supplemental Response to Final Office Action dated Oct. 31, 2025 for U.S. Appl. No. 17/358,261 as filed on Feb. 6, 2026; 11 Pages.

* cited by examiner

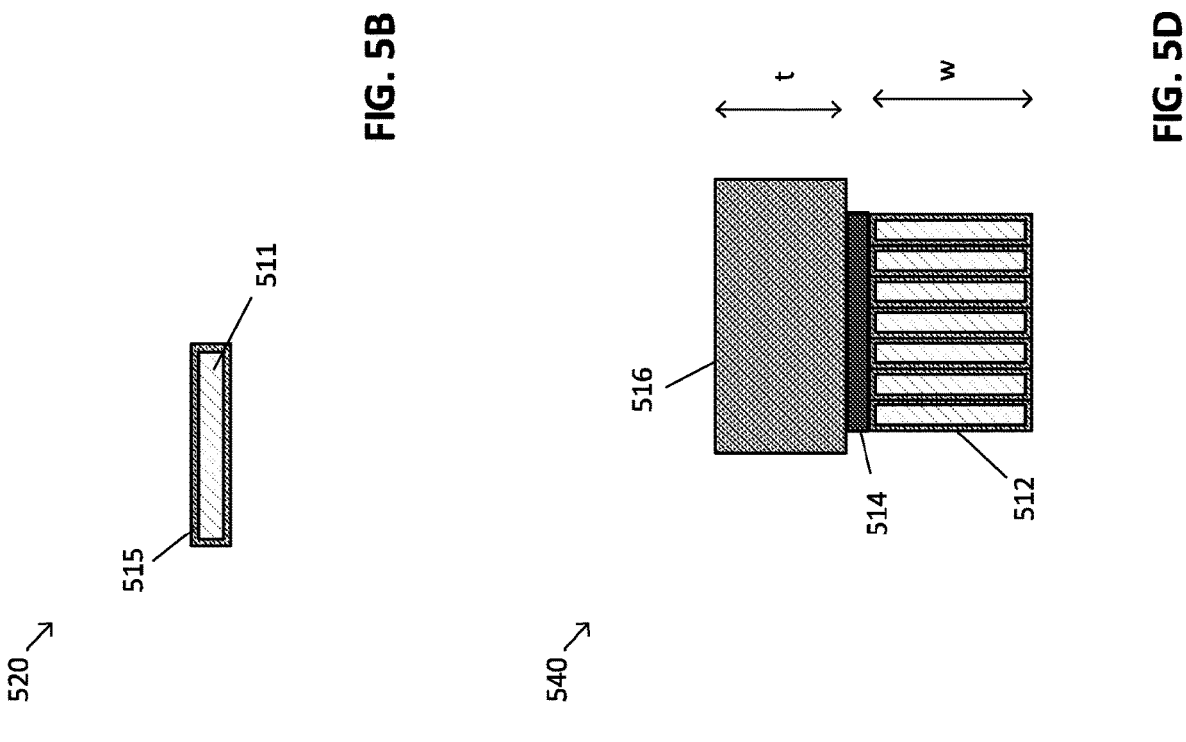
FIG. 5A
FIG. 5B
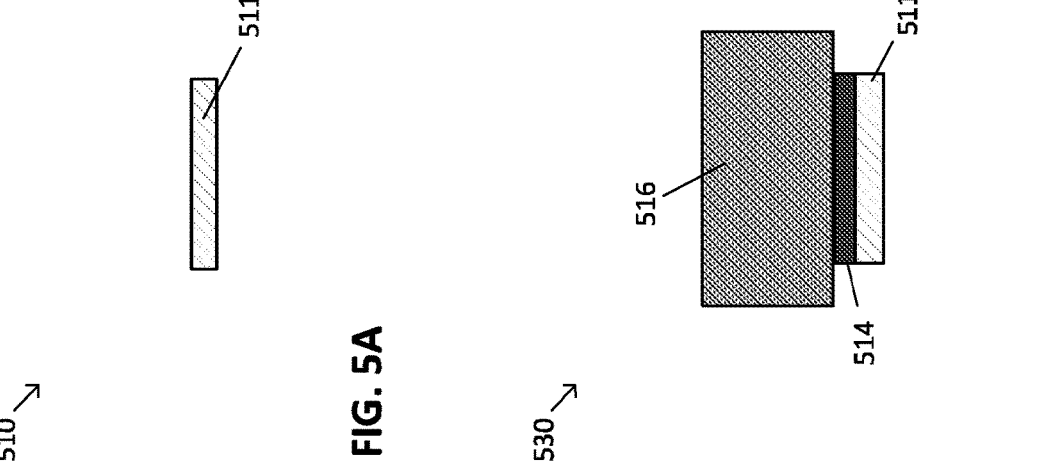
FIG. 5C
FIG. 5D

1100

1113

1114

1111

1112

Coolant Inlet

Coolant Outlet

621

Coolant Inlet

Coolant Outlet

1211

PASSIVE QUENCH PROTECTION TECHNIQUES FOR NON-INSULATED SUPERCONDUCTING MAGNETS

CROSS REFERENCE TO RELATED APPLICATIONS

This application is a 371 National Stage Entry of International Patent Application PCT/US2021/024079 filed in the English language on Mar. 25, 2021, which application claims the benefit of U.S. provisional application No. 63/000,381, filed on Mar. 26, 2020, which application is hereby incorporated herein by reference in its entirety.

BACKGROUND

Superconductors are materials that have no electrical resistance to current (are "superconducting") below some critical temperature. For many superconductors, the critical temperature is below 30 K, such that operation of these materials in a superconducting state requires significant cooling, such as with liquid helium or supercritical helium.

High-field magnets are often constructed from superconductors due to the capability of superconductors to carry a high current without resistance. Such magnets may, for instance, carry currents greater than 5 kA.

SUMMARY

According to some aspects, a magnet is provided comprising a coil comprising a plurality of windings of a non-insulated wire, the wire comprising a stack of high temperature superconductor (HTS) tapes, wherein each of the HTS tapes comprises an HTS material and is clad in a conductive material, a co-conductor layer, and a layer of solder arranged between and in contact with the stack of HTS tapes and the co-conductor layer.

According to some aspects, a magnet is provided comprising a coil comprising a plurality of windings of a non-insulated wire, the wire comprising a stack of high temperature superconductor (HTS) tapes, wherein each of the HTS tapes comprises a superconductor layer and is clad in a conductive material, wherein a ratio between a cross-sectional area of the conductive material and a cross-sectional area of the superconductor layer is at least 0.75.

According to some aspects, a magnet is provided comprising a coil comprising a plurality of windings of a non-insulated wire, the wire comprising a stack of high temperature superconductor (HTS) tapes, wherein each of the HTS tapes comprises an HTS material and is clad in a conductive material, and a stack of conductive non-superconductor tapes arranged in contact with the stack of HTS tapes.

According to some aspects, a magnet is provided comprising a coil comprising a plurality of windings of a non-insulated wire, the wire comprising a stack of high temperature superconductor (HTS) tapes, wherein each of the HTS tapes comprises an HTS material having a conductive material disposed over at least a portion thereof, a co-conductor layer arranged over the stack of HTS tapes, and solder disposed between and in electrical contact with the stack of HTS tapes and the co-conductor layer.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIGS. 5A-5G are a series of cross-sectional views of different coil designs for a NI superconducting magnet, according to some embodiments;

DETAILED DESCRIPTION

Figure 1:
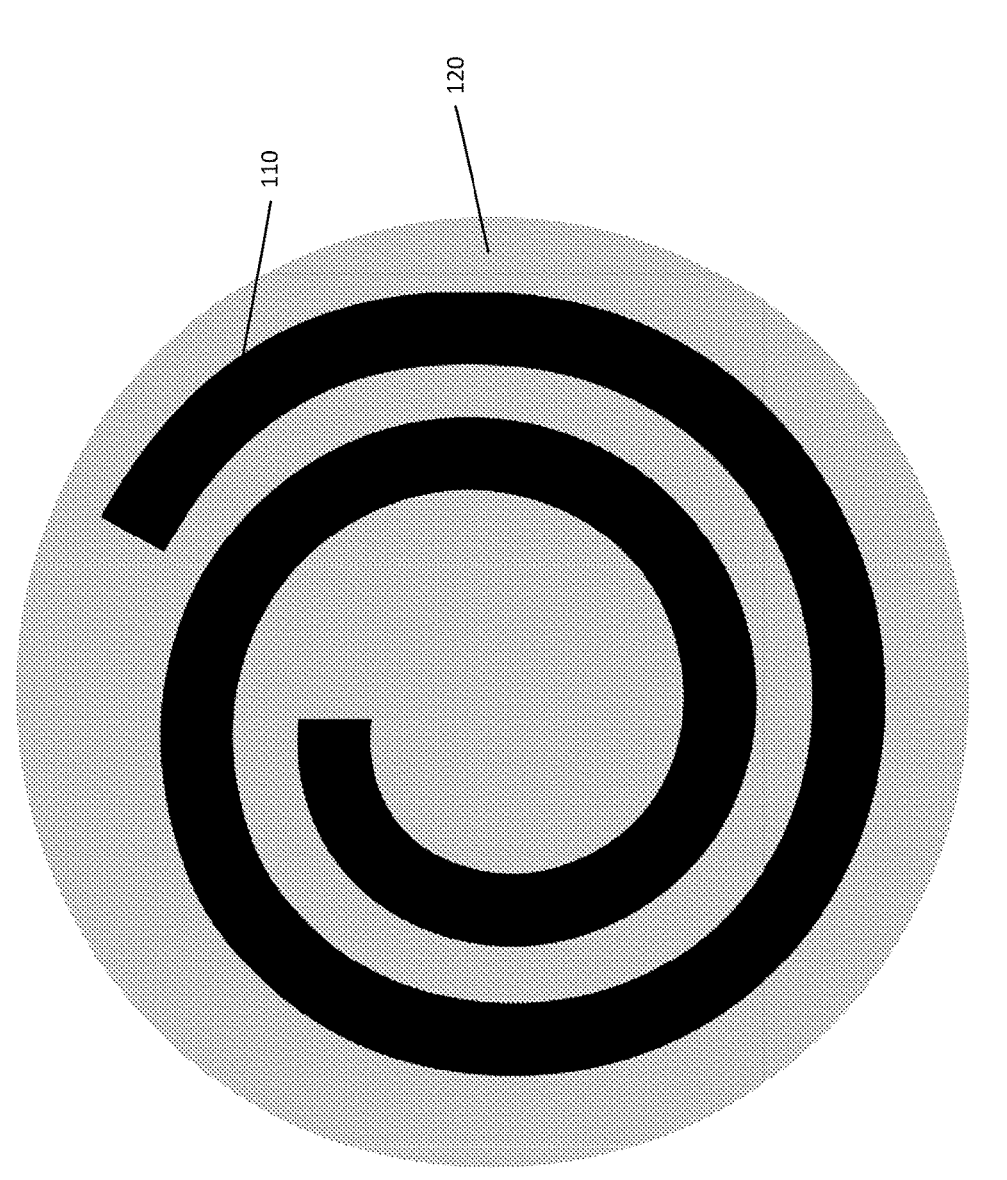
FIG. 1 is a plan view of a non-insulated (NI) superconducting magnet.

A high-field superconducting magnet often comprises multiple electrically insulated cable turns grouped in a multi-layer arrangement. When a superconductor within the cable is cold enough to be below its critical temperature (the temperature below which the electrical resistivity of the material drops to zero), driving the magnet allows current to pass through the superconducting path without losses. However, for various reasons some or all of the superconductor may be heated to above its critical temperature and therefore lose its superconducting characteristics. If uncontrolled, such heating can lead to the superconductor losing its superconducting abilities, often referred to as a "quench."

Moreover, if the quench is not properly addressed by the system (e.g., by shutting down), components can be damaged by the heating.

Some superconducting magnet systems handle quench events via a system of active alarms and detection mechanisms. Other superconducting magnet systems handle quenches passively through design of the superconducting magnet itself. An example of one such design is a non-insulated (NI) magnet (also sometimes referred to as a no-insulation (NI) magnet), in which adjacent superconducting turns of the magnet are not insulated from one another but are instead separated by a conventional conductor (i.e., not a superconductor). When the magnet is operating below the superconductor's critical temperature, current flows through the superconductor and not across turns because the superconductor has zero resistance compared with the finite resistance of the conductor that lies between the turns. During a quench, however, current can flow between the turns and thereby be diverted from flowing through the superconductor which may have at least portions thereof in a "normal" (non-superconducting) state. Thus, NI magnets, and in particular NI-HTS magnets (NI magnets that comprise HTS superconductors), can in principle be passively protected against quench damage without the need to continuously monitor quench events and/or to actively engage external quench protection mechanisms.

As NI-HTS magnets grow in size, magnetic field strength and stored magnetic energy, however, the above-described self-protective feature may become increasingly stressed and potentially less reliable. For instance, the magnetic energy of a magnet scales with the volume enclosed by the magnet and scales with the magnetic field strength squared, whereas the heat capacity of the magnet scales with the volume of the winding pack and associated structures. This means that as the bore of the magnet and its field strength both increase in size, the magnet must be effective at dissipating stored magnetic energy uniformly. Otherwise, localized hot spots and/or thermal-gradient induced stresses, may damage the magnet.

The inventors have recognized and appreciated techniques for designing NI-HTS magnets that mitigate problems that may arise during quench initiation and propagation. In particular, the inventors have recognized and appreciated that coupling the HTS material to a co-conductor along its length reduces the effective resistance of the conductive path along the HTS material when it is not superconducting, and that this leads to numerous advantages for quench mitigation.

As described further below, the inventors have recognized and appreciated that the effective resistance of the conductive path along the HTS material when it is not superconducting controls several aspects of a system during a quench, as follows. First, during a quench in a NI-HTS magnet, current continues to circulate within the turns for some time even though some or all of the HTS material has become normal (non-superconducting). This current decays with a characteristic time that is a function of the resistances of conductive paths within the magnet. Second, the highest possible magnetic energy dissipation power density that can occur during a quench is also a function of the resistances of the conductive paths within the magnet. Third, the maximum temperature gradient, the peak temperature, and the resulting temperature induced stresses that can occur during a quench are also a function of the resistances of the conductive paths within the magnet. Fourth, the stability of quenches in which normal zones arise within otherwise superconducting turns of the magnet may be predicted based on the resistances of the conductive paths within the magnet. The above-summarized relationships are described further below along with practical implementations of NI-HTS magnets that capitalize on said relationships, resulting in an improved NI-HTS magnet.

As used herein, a "high temperature superconductor" or "HTS" refers to a material that has a critical temperature above 30° K, wherein the critical temperature refers to the temperature below which the electrical resistivity of the material is zero. The critical temperature can in some cases depend on other factors such as the presence of an electromagnetic field. It will be appreciated that where the critical temperature of a material is referred to herein, this may refer to whatever the critical temperature happens to be for that material under the given conditions.

FIG. 1 illustrates a schematic of a non-insulated (NI) superconducting magnet, for purposes of explanation. In the example of FIG. 1, a two-turn coil 110 of a magnet 100 is shown. The coil 110, which comprises a superconductor, is electrically coupled to a conductive material 120. When the superconductor of the coil is sufficiently cold to be superconducting, current flows within the coil because it can do so with zero resistance, as opposed to flowing through the conductive material 120, which has a finite resistance. During a quench in which some or all of the superconductor of the coil becomes normal (non-superconducting), the current that would otherwise flow through the coil will flow through the conductive material 120 as well as through the coil. In this manner, the design of the non-insulated superconducting magnet 110 in principle passively protects the superconductor in the coil 110 against quench damage that may be sustained by diverting at least some of the current that would flow through the superconductor.

Figures 2A, 2B:
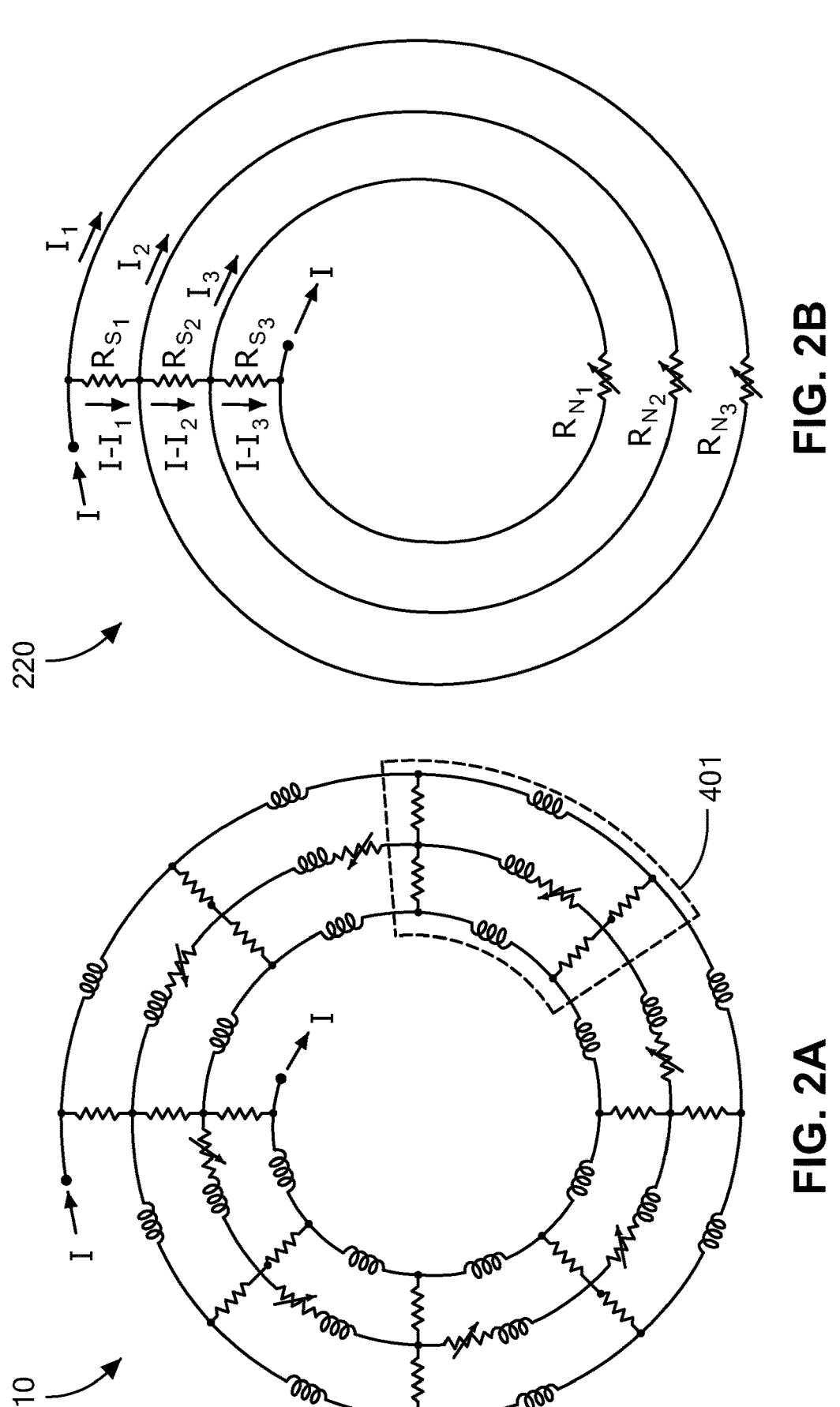
FIGS. 2A-2B depict lumped-element circuit models of a NI superconducting coil, according to some embodiments.

The inventors have recognized and appreciated that a NI superconducting coil can be approximated by a lumped-element circuit model, as shown in FIG. 2A. In the example of FIG. 2A, circuit 210 represents a three-turn non-insulated coil as a number of inductors coupled to variable resistors along the turns, with additional resistors across the turns. The variable resistors represent the change in state of the superconducting turns, from their superconducting state in which there is a zero resistance path along the coil, to the normal state in which there is a finite resistance along the coil. For clarity, the variable resistors are shown only in the middle turn but could in general be considered to be present within each turn of the coil. A portion of the circuit 210, identified by the dashed box and labeled 401 in FIG. 2A, is considered in relation to FIG. 4 below.

The network circuit model of FIG. 2A may be used to understand the physics that governs: (1) the rate and spatial distribution of stored magnetic energy dissipation during a full magnet quench; and (2) the magnitude of turn-to-turn current sharing arising from the prompt formation of a localized normal zone. These models indicate NI magnet design techniques that, when applied, can produce NI magnets that mitigate the impact of these events.

The network circuit model of FIG. 2A may be simplified even further to the reduced lumped element circuit model shown in FIG. 2B. In the example of circuit 220 shown in FIG. 2B, the coils is represented by turns with respective turn-to-turn finite bypass resistances $R_{S1}$, $R_{S2}$ and $R_{S3}$ and a variable resistance within respective turns of $R_{N1}$, $R_{N2}$ and $R_{N3}$. In cases in which the coils only contain a superconductor, the resistances of the coils $R_{S1}$, $R_{S2}$ and $R_{S3}$ represent the normal resistance of the superconductor. More generally, however, the coils may contain additional non-superconductor material (e.g., a conventional metal conductor), in which case the resistances of the coils $R_{S1}$, $R_{S2}$ and $R_{S3}$ represent the combined resistance of the superconductor in a non-superconducting (normal) state, plus that of the additional material. For this reason, hereinafter the coil is referred to as being formed from a "composite" material to refer to this more general combination of materials (superconductor plus additional material) from which the coil may be formed.

Figure 3B:
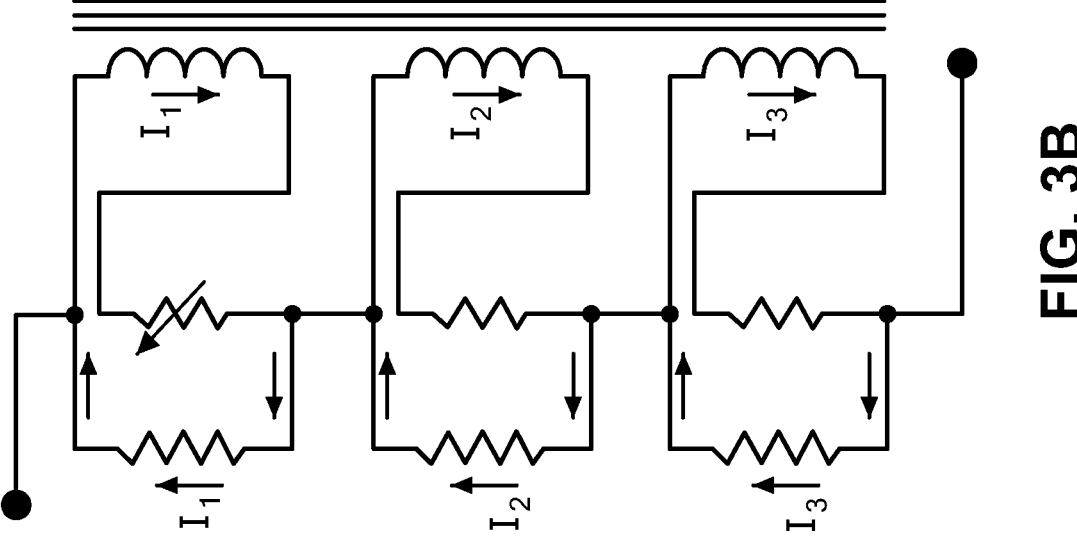
FIGS. 3A-3B depict transformer graphics of a NI superconducting coil during steady state and during a quench, respectively, according to some embodiments.
Figure 3A:
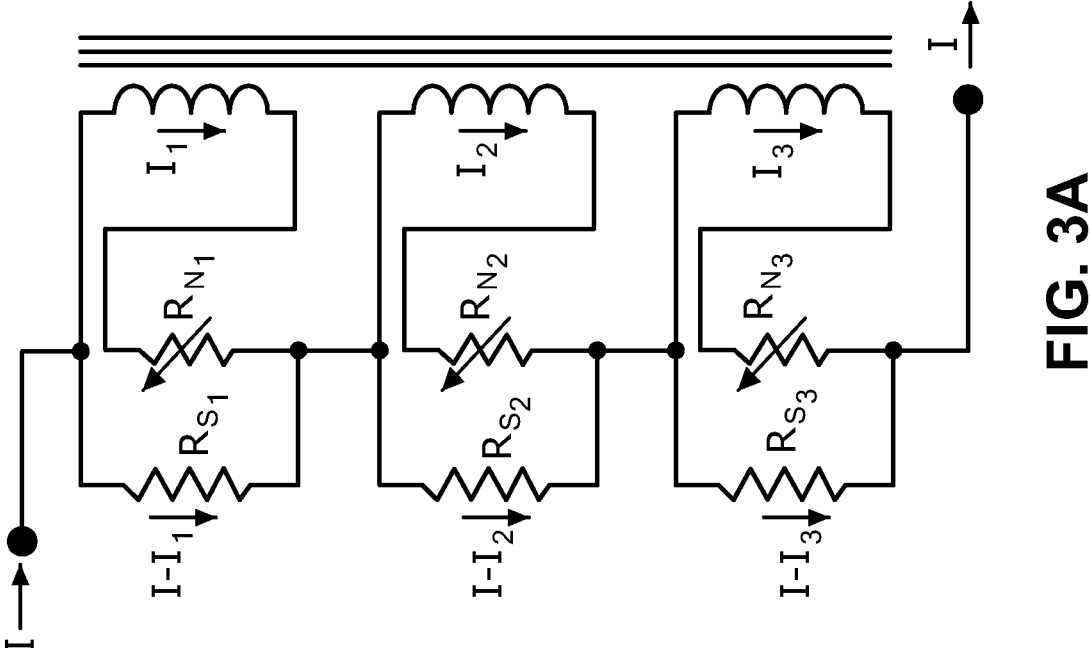

The circuit models of FIGS. 2A-2B may be redrawn with a transformer graphic to explicitly indicate the mutual inductive coupling among turns of the coil, as shown in FIGS. 3A-3B. Steady state current flow through the coil is distributed according to bypass resistance $R_{S1}$, $R_{S2}$ or $R_{S3}$ and through-turn resistances of $R_{N1}$, $R_{N2}$ and $R_{N3}$.

It may be noted that the magnitude of an operational current ($I_{OP}$) flowing in the composite material of the coil relative to a critical current rating of the superconductor within the composite material ($I_C$), determines the value of $R_N$ (referring generally to the through-turn resistance of a given turn). When $I_{OP}$ is much less than $I_C$, the superconductor is superconducting and $R_N$ is essentially zero. When $I_{OP}$ is much greater than $I_C$, the superconductor is normal and $R_N$ becomes essentially the parallel resistance of the remaining (non-superconducting) material in the composite material of the coil. Because the turns enclose common magnetic flux areas they couple inductively.

As shown in FIG. 3A, when current flows through the coil in a superconducting mode, the through-turn resistances $R_{N1}$, $R_{N2}$ and $R_{N3}$ are zero, so the current all flows along the right-hand paths of each of the three illustrated blocks of the circuit. When the external current is interrupted, as shown in FIG. 3B, current in each turn continues to flow, closing via its bypass resistance. The characteristic "L/R" decay time of this current is set by the inductance of that turn (self-inductance) coupled with other turns (mutual inductances), and the sum of bypass and through-turn resistances for that turn ($R_S + R_N$).

Generally, this "L/R" response is the mechanism by which the stored energy of the magnet is dissipated into the winding pack, which can occur both during planned events (e.g., open-circuit magnet interruption) and unplanned events (e.g., formation of a local normal zone leading to a full magnet quench). Initially the "L/R" decay times are long, as the HTS remains superconducting in some zones. But as the turns heat up and the HTS goes normal everywhere, the decay times asymptote to the shortest possible "L/R" values.

The inventors have recognized and appreciated that $R_S$ and $R_N$ (particularly the maximum attainable value of $R_N$, i.e., its normal value) are determined entirely by the magnet design. This means that the shortest possible "L/R" quench decay time of the magnet is also determined by the magnet design.

According to some embodiments, the composite material from which the coil in a NI magnet is formed may be configured to reduce the maximum resistance $R_N$ of the composite material. In some cases, a co-conductor may be electrically coupled to the superconductor in the coil to provide a low-resistance path when the superconductor is normal. Particular examples of such a co-conductor are discussed further below, though generally speaking by increasing the cross-sectional area of the co-conductor in the windings, the maximum attainable value of $R_N$ can be reduced. The resultant decrease in ($R_S + R_N$) increases the lower limit for the shortest possible "L/R" quench decay time that the magnet can have. Decreasing $R_N$ may be particularly effective given that the NI magnet may be configured such that the resistance $R_N$ is much larger than the resistance $R_S$, in which case $R_N$ is the key controlling parameter determining the value of ($R_S + R_N$).

Note that the thermal energy needed to raise the temperature of the entire winding pack from its operating temperature (e.g., 20K) to a temperature at which the HTS is fully normal (~90K) can be just a small fraction (e.g., <10%) of the total magnetic energy. Thus, what happens to the release of the remaining 90% is controlled entirely by magnet design—most importantly the cross-sectional area of the embedded copper windings (copper cap plus co-wind copper)—and its "L/R" decay time.

Similar to the above, the highest possible magnetic energy dissipation power density (watts per cubic meter) in the winding pack during a quench scales as the stored magnetic energy per unit winding pack volume divided by the shortest possible characteristic "L/R" time. Thus in controlling the shortest possible "L/R" time, the highest possible magnetic energy dissipation power density that can occur during a quench is also controlled.

With respect to temperature gradients induced during a quench, for magnets in which $R_N$ is larger than $R_S$, the volumetric joule heating which occurs in the composite material of the coil during a magnet quench is large compared with the amount of volumetric joule heating which occurs within the conductive material arranged between turns of the coil. Consequently, the composite material is expected to attain the highest temperature in the magnet during a quench event, and heat is therefore expected to flow from this composite material into the conductive material between the coils. The magnitude of this heat flow determines the magnitude of the temperature gradients in both the composite and conductive materials.

The inventors have recognized and appreciated that if the electrical conductivity of the composite material of the coil is much greater than the electrical conductivity of the conductive material arranged between the turns of the coil, the thermal conductivity of the composite material would also be greater (and in some instances, much greater) than the thermal conductivity of the conductive material (Wiedemann-Franz law). In such a magnet, the largest temperature gradients, and temperature gradient-induced stresses, would be expected to occur in the conductive material arranged between the turns of the coil. Thus, by controlling the highest possible magnetic energy dissipation power density (joule heating) in the manner noted above, the temperature gradient (e.g. the maximum temperature gradient) and temperature gradient induced stress during a quench is also controlled.

This distribution of heat may be reliant on good thermal contact between components of the composite material of the coil, and between the coil and the conductive material arranged between the turns of the coil. Such contact would reduce, and ideally minimize, temperature differences between components as heat is forced to flow through their interfaces during quench events.

The peak temperatures attained by the coil and the conductive material arranged between turns of the coil (together, the "winding pack") during a quench, and the location of the temperature, are important parameters. The melting temperatures of various materials within the magnet may, for instance, set hard upper limits on the temperatures that may be experienced by the materials without permanent damage being caused to the magnet. As discussed above, temperature gradients (e.g. maximum temperature gradients) in the winding pack can be controlled by magnet design choices, in particular, choices for $R_N$ and $R_S$. These choices, in combination with fixing the overall thermal mass, are the means to control a temperature (e.g., a maximum temperature) that the winding pack could possibly experience during a quench.

Additionally, there may be a considerable advantage to choose $R_N$ and/or $R_S$ to vary with position (e.g., radial distance) in the magnet. For example, this can serve to preferentially decrease temperature gradients and peak temperatures in key areas, such as to limit the temperature rise at joint locations where particular materials may be used. An example of a magnet design in which $R_N$ is varied with position is discussed further below.

In situations where the operating current of the magnet ($I_{OP}$) approaches locally the critical current rating ($I_C$) of the superconductor in the coil, the possibility of triggering a fast propagating quench, referred to herein as a "tsunami quench," may be considered. Tsunami quenches can be triggered when, due to the formation of a local normal zone turn-to-turn current-sharing pushes current above $I_C$ in one or more adjacent turns causing normal zones to appear in these turns as well. This can precipitate a cascade of normal zones in adjacent turns—propagating initially not via a temperature rise, but via spikes in the current in the turn-to-turn shared current.

Following a tsunami quench, the magnet proceeds to quench via the usual thermal processes, albeit with a modified distribution of currents in the turns compared with a quench in which the whole coil quenches at the same time. Currents in each turn decay and magnetic energy is correspondingly dissipated into the winding pack as discussed above. Since tsunami quench current sharing is an electrical response, the magnet can be designed so as to avoid triggering them. In other words, with suitable design, a NI magnet can be made to operate at high values of $I_{OP}/I_C$ and not be susceptible to tsunami quench propagation.

Figure 4:
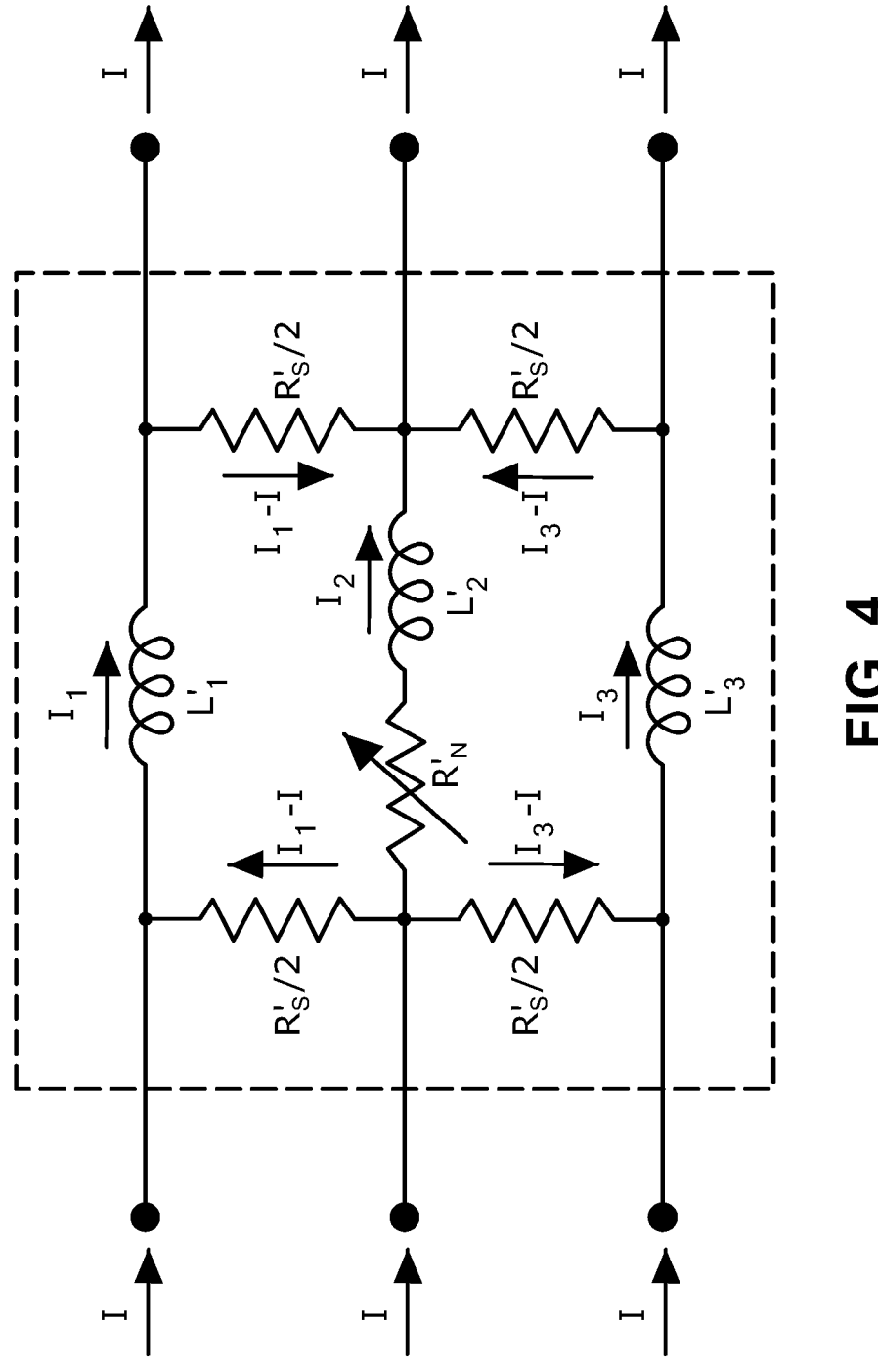
FIG. 4 depicts a circuit model of a portion of a NI superconducting coil, according to some embodiments.

The lumped element circuit model shown in FIG. 4 qualitatively reproduces the turn-to-turn current sharing physics involved in tsunami quench propagation. It represents a small section of the magnet—specifically, the dashed boxed region 401 shown in FIG. 2A). In this model, a local normal zone is postulated to appear instantaneously at t=0, represented by a nonzero value of $R'_N$. $R'_N$ is the resistance of the composite material of the coil in the normal zone region. $R'_S$ is the corresponding turn-to-turn resistance in the vicinity of the normal zone. Both these values depend on the length of the normal zone, $L_N$: $R'_N$ is proportional to $L_N$ while $R'_S$ is proportional to $1/L_N$.

In order for $R'_N$ to be greater than zero, it may be assumed that some initial event causes $I_{OP}$ to exceed $I_C$ in this region (otherwise the superconductor would be superconducting and $R'_N$ would be zero). This could be caused by a local temperature perturbation in the magnet due to some off-normal event, such as a loss of coolant event.

Over short time scales, the total azimuthal current flowing in the coil is approximately conserved: $I_1+I_2+I_3=3I_{OP}$ (to conserve total magnetic flux). Therefore, if $I_2$ promptly decreases, $I_1$ and/or $I_3$ are expected to promptly increase to compensate. If either of these exceeds the local critical current level, a fast propagating "tsunami quench" could ensue.

Approximating the circuit elements in all turns as being identical, the time-dependent currents in turns 1 and 2 can be computed as:

$$I_1(t) = I_{OP}\frac{R'_S + R'_N(3 - e^{-t/\tau})}{R'_S + 2R'_N}; I_2(t) = I_{OP}\frac{R'_S + R'_N 2e^{-t/\tau}}{R'_S + 2R'_N}$$

with the current sharing current distribution established in a characteristic time $\tau$, which is a function of $R'_S$, $R'_N$ and inductances:

$$\tau = \frac{3L'_2 + L'_{1,3} - 4L'_{1,2}}{R'_S + 2R'_N}$$

For times longer than $\tau$, the currents are expected to asymptote to:

$$I_1(t) = I_{OP}\frac{R'_S + 3R'_N}{R'_S + 2R'_N}; I_2(t) = I_{OP}\frac{R'_S}{R'_S + 2R'_N}$$

As such, it is evident that the value of $R'_N$ compared with $R'_S$ is a significant parameter in the design of the magnet. In the example of FIG. 4, for instance, reducing $R'_N$ relative to $R'_S$ increases the level of current that is retained in turn 2, thereby reducing the magnitude of current spikes that appear in turns 1 and 3. As a result, decreasing $R'_N$ through suitable magnet design allows the magnet to be operated safely at higher values of $I_{OP}/I_C$, or equivalently, to be operated safety at the same value of $I_{OP}/I_C$ while accommodating the formation of a normal zone region of longer length.

Figures 5E, 5F, 5G:
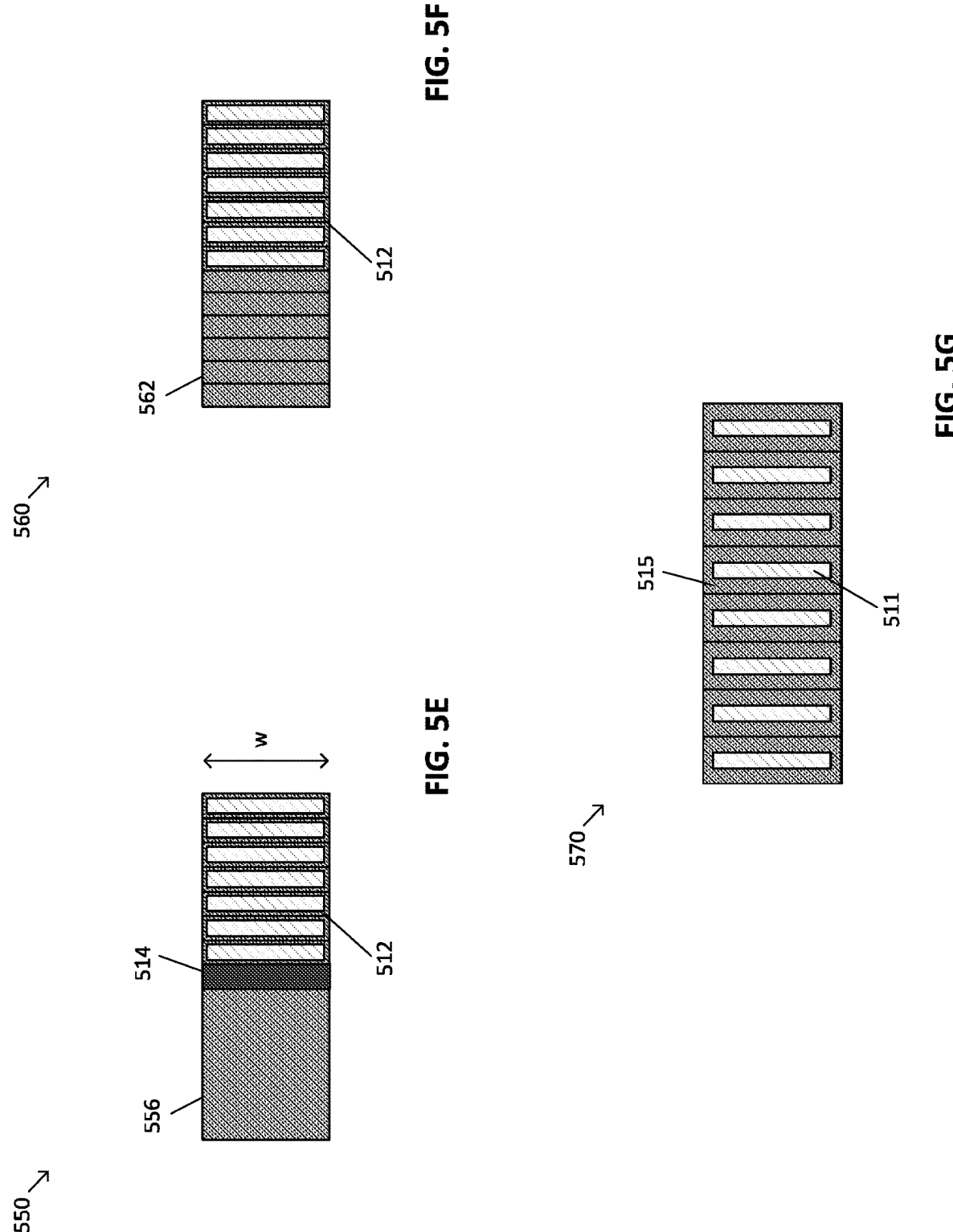

FIGS. 5A-5G depict cross-sections of different coil designs for a NI superconducting magnet, according to some embodiments. To illustrate how the above-described principles may be applied to a NI superconducting magnet, FIGS. 5B-5G depict various composite materials of a coil of an NI superconducting magnet, with FIG. 5A depicting a bare superconductor for comparison.

In the example of FIG. 5A, coil 510 comprises only a superconductor layer 511. The superconductor layer 511 may comprise a superconducting material in addition to one or more layers such as a substrate on which the superconducting material is deposited, and/or buffer layers (not shown in FIG. 5A). The superconducting material of the superconductor layer 511 may for instance be an HTS such as a rare earth barium copper oxide (REBCO), e.g., yttrium barium copper oxide (YBCO).

As discussed above, a coil of a NI superconducting magnet consisting of or consisting essentially of only a superconductor (whether in the presence or absence of a substrate and/or buffer layers) may exhibit numerous problems during a quench. While the design of the NI superconducting magnet provides some protection to the superconductor by diverting current into the conducting material between the turns of the coil, the current in the coil may nonetheless decay too quickly (with an L/R characteristic time), sharp thermal gradients may be produced, etc. so as to damage the magnet. In the example of FIG. 5A, $R_N$ is the resistance of the superconductor layer 511 when the superconducting material within the layer is normal.

For comparison, FIG. 5B illustrates a coil 520 which comprises the superconductor layer 511 in addition to a cladding material 515. As with FIG. 5A, the superconductor layer 511 may comprise a superconducting material and optionally may include one or more additional layers such as a substrate and/or buffer layers. A NI superconducting magnet may commonly include a thin layer of a conductive material (e.g. a cladding material, such as copper), surrounding the superconductor layer. In the case in which the superconductor layer 511 includes a substrate and/or buffer layers, the conductive material 515 may be deposited around these layers as well. For instance, a superconductor layer may have a conductive layer (e.g. a cladding layer) with a thickness of around 10% of the thickness of the superconductor layer deposited around the layer. As such, while coil 520 may have a lower resistance than coil 510 when the superconducting material in the superconductor layer 511 is normal, a means for a further reduction in $R_N$ may be desirable as discussed above.

In the example of FIG. 5C, coil 530 comprises a conductive "cap" 516 that is electrically coupled to the superconductor layer 511 via a solder 514. As shown, the cap 516 has a cross section that is larger than (and in some cases, much larger than) that of the superconductor layer 511. As a result, assuming that the cap 516 is a sufficiently good conductor, the value of $R_N$ is expected to be lower (and in some cases, substantially lower) than that of either coils 510 or 520. In other words, when the superconducting material within superconductor layer 511 is normal, the current may flow through the cap 516 with comparatively low resistance (i.e. the resistance characteristic of the cap is low compared with the resistance characteristic of the coils). Solder 514 is provided to ensure electrical and thermal coupling between the superconductor layer 511 and the cap 516 and may comprise any suitable conductive material that may provide said coupling.

According to some embodiments, cap 516 may comprise, or may consist of, aluminum, copper or a copper alloy (e.g., AMZIRC). According to some embodiments, cap 516 may comprise, or may consist of, a high strength conductive alloy, such as a copper-based metal matrix composite alloy (e.g., Glidcop®). According to some embodiments, solder 514 may comprise a Pb and/or Sn solder. In some embodiments, solder 514 may comprise a metal having a melting point of less than 200° C., wherein at least 50 wt % of the metal is Pb and/or Sn, and at least 0.1 wt % of the metal is Cu.

FIG. 5D illustrates coil 540, which comprises a stack 512 of superconductor "tapes." Each of the superconductor tapes comprise a superconductor layer 511 which is clad in a conducting material, such as copper (as such, each tape is as the structure described in FIG. 5B). In addition, the stack of tapes 512 is electrically coupled via solder 514 to a co-conductor cap 516 of thickness t. The superconducting material within the superconductor layer of each tape of stack 512 may be a long, thin strand of HTS material with cross-sectional dimensions in the range of about 0.001 mm to about 0.1 mm in thickness (or height) and a width (labeled w in FIG. 5D) in the range of about 1 mm to about 12 mm (and with a length that extends along the length of the cable, e.g., into and out of the page in the example of FIG. 5D). According to some embodiments, each strand of HTS tape may comprise an HTS material such as REBCO. In some embodiments, HTS tape may comprise a polycrystalline HTS and/or may have a high level of grain alignment.

In some embodiments, the cap 516 has a thickness t of greater than or equal to 1 mm, 2 mm, 4 mm, 6 mm, 8 mm, 10 mm, 12 mm, or 15 mm. In some embodiments, the cap 516 has a thickness t of less than or equal to 20 mm, 15 mm, 12 mm, 10 mm, 8 mm, 5 mm, 4 mm, or 2 mm. Any suitable combinations of the above-referenced ranges are also possible (e.g., a thickness t of greater or equal to 1 mm and less than or equal to 5 mm).

In some embodiments, the tapes of stack 512 have a width w of greater than or equal to 1 mm, 2 mm, 4 mm, 6 mm, 8 mm, 10 mm, 12 mm or 15 mm. In some embodiments, the tapes of stack 512 have a width w of less than or equal to 20 mm, 15 mm, 12 mm, 10 mm, 8 mm, 5 mm, 4 mm, or 2 mm. Any suitable combinations of the above-referenced ranges are also possible (e.g., a width w of greater or equal to 1 mm and less than or equal to 5 mm).

In some embodiments, a ratio t/w (the ratio of the thickness t of the cap 516 to the width w of the tapes of stack 512) is greater than or equal to 0.5, 0.75, 0.9, 1.0, 1.1, 1.25, 1.5, 2.0, 5, 10, 15 or 20. In some embodiments, the ratio t/w is less than or equal to 20, 15, 10, 5, 2.0, 1.5, 1.25, 1.1, 1.0, 0.9, 0.75, or 0.5. Any suitable combinations of the above-referenced ranges are also possible (e.g., a ratio t/w of greater than or equal to 2 and less than or equal to 10).

In some embodiments, the resistance per unit length of the components of coil 540 that are non-superconducting at temperatures below the critical temperature of the HTS tapes in stack 512 (specifically, the components in question are the cap 516, the solder 514 and the cladding around the tapes of stack 512) is greater than or equal to 2 micro ohms per meter ($\mu\Omega/m$), 10 $\mu\Omega/m$, 50 $\mu\Omega/m$, 100 $\mu\Omega/m$, 150 $\mu\Omega/m$, or 200 $\mu\Omega/m$. In some embodiments, the resistance per unit length of these components of coil 540 is less than or equal to 250 $\mu\Omega/m$, 200 $\mu\Omega/m$, 150 $\mu\Omega/m$, 100 $\mu\Omega/m$, 50 $\mu\Omega/m$ or 25 $\mu\Omega/m$. Any suitable combinations of the above-referenced ranges are also possible (e.g., a resistance per unit length of these components greater than or equal to 150 $\mu\Omega/m$ and less than or equal to 200 $\mu\Omega/m$).

In some embodiments, a ratio X of the resistance per unit length of the components of coil 540 that are non-superconducting at temperatures below the critical temperature of the HTS tapes in stack 512 (specifically, the components in question are the cap 516, the solder 514 and the cladding around the tapes of stack 512) to the resistance per unit length of the coil 510 is greater than or equal to 100, 500, 1000, 10,000, 50,000, or 100,000. In some embodiments, X is less than or equal to 100,000, 50,000, 10,000, 1000, 500 or 100. Any suitable combinations of the above-referenced ranges are also possible (e.g., the ratio X is greater than or equal to 10,000 and less than or equal to 50,00).

In some embodiments, a ratio of the cross-sectional area of the co-conductor cap 516 to the cross-sectional area of the stack of tapes 512 is greater than or equal to 0.1, 0.25, 0.5, 0.75, 1.0, 1.25, 1.5, 2.0, 2.5, 3.0, 3.5, or 4.0. In some embodiments, the ratio of the cross-sectional area of the co-conductor cap 516 to the cross-sectional area of the stack of tapes 512 is less than or equal to 4.0, 3.5, 3.0, 2.5, 2.0, 1.5, 1.25, 1.0, 0.75, 0.5, 0.25, or 0.1. Any suitable combinations of the above-referenced ranges are also possible (e.g., a ratio of the cross-sectional area of the co-conductor cap 516 to the cross-sectional area of the stack of tapes 512 of greater than or equal to 1 and less than or equal to 4).

FIG. 5E illustrates coil 550, which comprises a stack 512 of superconductor tapes that are each clad in a conducting material, such as copper, in addition to a co-conductor 556 that is electrically coupled to the stack of tapes via solder 514. In contrast to the coil 540 shown in FIG. 5D, the coil 550 includes a co-conductor alongside the stack of tapes rather than over the stack of tapes as a cap. The superconducting material within the superconductor layer of each tape of stack 512 may be a long, thin strand of HTS material with cross-sectional dimensions in the range of about 0.001 mm to about 0.1 mm in thickness (or height) and a width (labeled w in FIG. 5E) in the range of about 1 mm to about 12 mm (and with a length that extends along the length of the cable, e.g., into and out of the page in the example of FIG. 5E). According to some embodiments, each strand of HTS tape may comprise an HTS material such as REBCO. In some embodiments, HTS tape may comprise a polycrystalline HTS and/or may have a high level of grain alignment.

In some embodiments, the tapes of stack 512 shown in FIG. 5E have a width w of greater than or equal to 1 mm, 2 mm, 4 mm, 6 mm, 8 mm, 10 mm, 12 mm or 15 mm. In some embodiments, the tapes of stack 512 have a width w of less than or equal to 15 mm, 12 mm, 10 mm, 8 mm, 5 mm, 4 mm, or 2 mm. Any suitable combinations of the above-referenced ranges are also possible (e.g., a width w of greater or equal to 1 mm and less than or equal to 5 mm).

In some embodiments, the resistance per unit length of the components of coil 550 that are non-superconducting at temperatures below the critical temperature of the HTS tapes in stack 512 (specifically, the components in question are the cap 556, the solder 514 and the cladding around the tapes of stack 512) is greater than or equal to 2 micro ohms per meter ($\mu\Omega$/m), 10 $\mu\Omega$/m, 50 $\mu\Omega$/m, 100 $\mu\Omega$/m, 150 $\mu\Omega$/m, or 200 $\mu\Omega$/m. In some embodiments, the resistance per unit length of these components of coil 550 is less than or equal to 250 $\mu\Omega$/m, 200 $\mu\Omega$/m, 150 $\mu\Omega$/m, 100 $\mu\Omega$/m, 50 $\mu\Omega$/m or 25 $\mu\Omega$/m. Any suitable combinations of the above-referenced ranges are also possible (e.g., a resistance per unit length of these components greater than or equal to 150 $\mu\Omega$/m and less than or equal to 200 $\mu\Omega$/m).

In some embodiments, a ratio of the cross-sectional area of the co-conductor 556 to the cross-sectional area of the stack of tapes 512 is greater than or equal to 0.1, 0.25, 0.5, 0.75, 1.0, 1.25, 1.5, 2.0, 2.5, 3.0, 3.5, or 4.0. In some embodiments, the ratio of the cross-sectional area of the co-conductor 556 to the cross-sectional area of the stack of tapes 512 is less than or equal to 4.0, 3.5, 3.0, 2.5, 2.0, 1.5, 1.25, 1.0, 0.75, 0.5, 0.25, or 0.1. Any suitable combinations of the above-referenced ranges are also possible (e.g., a ratio of the cross-sectional area of the co-conductor 556 to the cross-sectional area of the stack of tapes 512 of greater than or equal to 0.75 and less than or equal to 1.5). As referred to above, the cross-sectional area refers to the area of the element as shown in the example of FIG. 5E.

FIG. 5F illustrates coil 560, which comprises a stack 512 of superconductor tapes that are each clad in a conducting material, such as copper, in addition to a co-conductor 562 in the form of a stack of non-superconducting conductive tapes. In the example of FIG. 5F, the co-conductor is provided in the form of tapes of a conductive material, rather than as a monolithic co-conductor as in the examples of FIGS. 5D and 5E.

In some embodiments, a ratio of the cross-sectional area of the stack of conductive tapes 562 to the cross-sectional area of the stack of tapes 512 is greater than or equal to 0.1, 0.25, 0.5, 0.75, 1.0, 1.25, 1.5, 2.0, 2.5, 3.0, 3.5, or 4.0. In some embodiments, the ratio of the cross-sectional area of the stack of conductive tapes 562 to the cross-sectional area of the stack of tapes 512 is less than or equal to 4.0, 3.5, 3.0, 2.5, 2.0, 1.5, 1.25, 1.0, 0.75, 0.5, 0.25, or 0.1. Any suitable combinations of the above-referenced ranges are also possible (e.g., a ratio of the cross-sectional area of the stack of conductive tapes 562 to the cross-sectional area of the stack of tapes 512 of greater than or equal to 0.75 and less than or equal to 1.5). As referred to above, the cross-sectional area refers to the area of the element as shown in the example of FIG. 5F.

FIG. 5G illustrates coil 570, which comprises a stack of tapes, each of which comprises a superconductor layer 511 in addition to a cladding material 515. In contrast to the example of FIG. 5B, however, in FIG. 5G the coil 570 includes a thick layer of cladding around each superconductor layer that is sufficient to act as a co-conductor that provides a sufficiently low value of $R_N$ to provide the above-described benefits. For instance, instead of the superconductor layer 511 having a conductive layer with a thickness of around 10% of the thickness of the superconductor layer around it, the thickness of the conductive (cladding) layer may be much larger, such as 50% of the thickness of the superconductor layer or greater. As noted above, each superconductor layer 511 may comprise a superconducting material and optionally may include one or more additional layers such as a substrate and/or buffer layers.

In some embodiments, a ratio between a cross-sectional area of the conductive cladding material 515 and a cross-sectional area of the superconductor layer 511 in the coil 570 is greater than or equal to 0.1, 0.25, 0.5, 0.75, 1.0, 1.25, 1.5, 2.0, 2.5, 3.0, 3.5, or 4.0. In some embodiments, the ratio is less than or equal to 4.0, 3.5, 3.0, 2.5, 2.0, 1.5, 1.25, 1.0, 0.75, 0.5, 0.25, or 0.1. Any suitable combinations of the above-referenced ranges are also possible (e.g., the ratio is greater than or equal to 1.0 and less than or equal to 4.0). As noted above, the superconductor layer may comprise a superconducting material and optionally may include one or more additional layers such as a substrate and/or buffer layers. As such, the cross-sectional area of the superconductor layer 511 may represent a combined cross-sectional area of a superconducting material, a substrate, one or more buffer layers, etc.

Figure 6A:
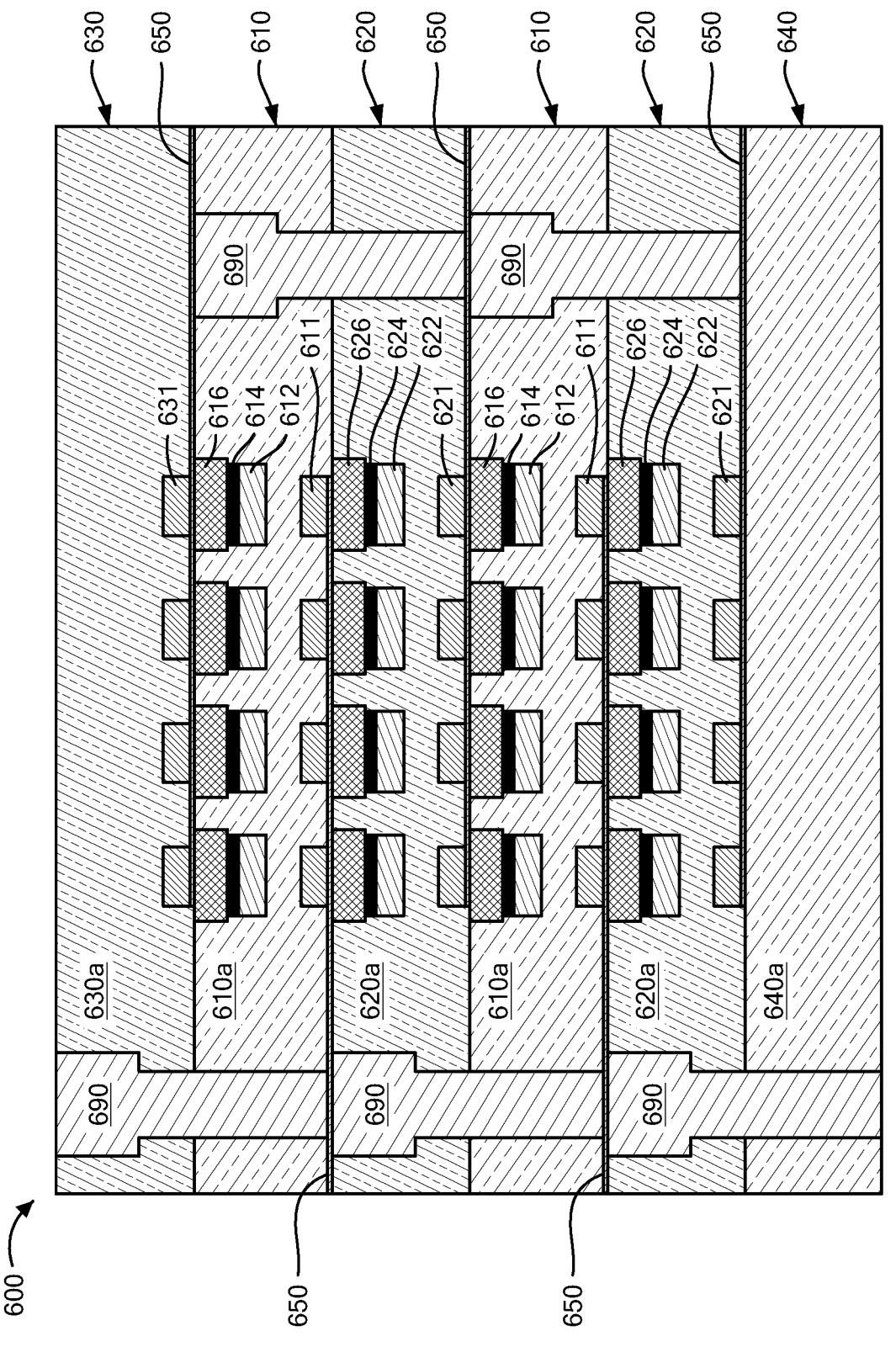
FIGS. 6A-6B are a series of cross-sectional views of an illustrative stack of plates in a superconducting magnet, according to some embodiments.
Figure 6B:
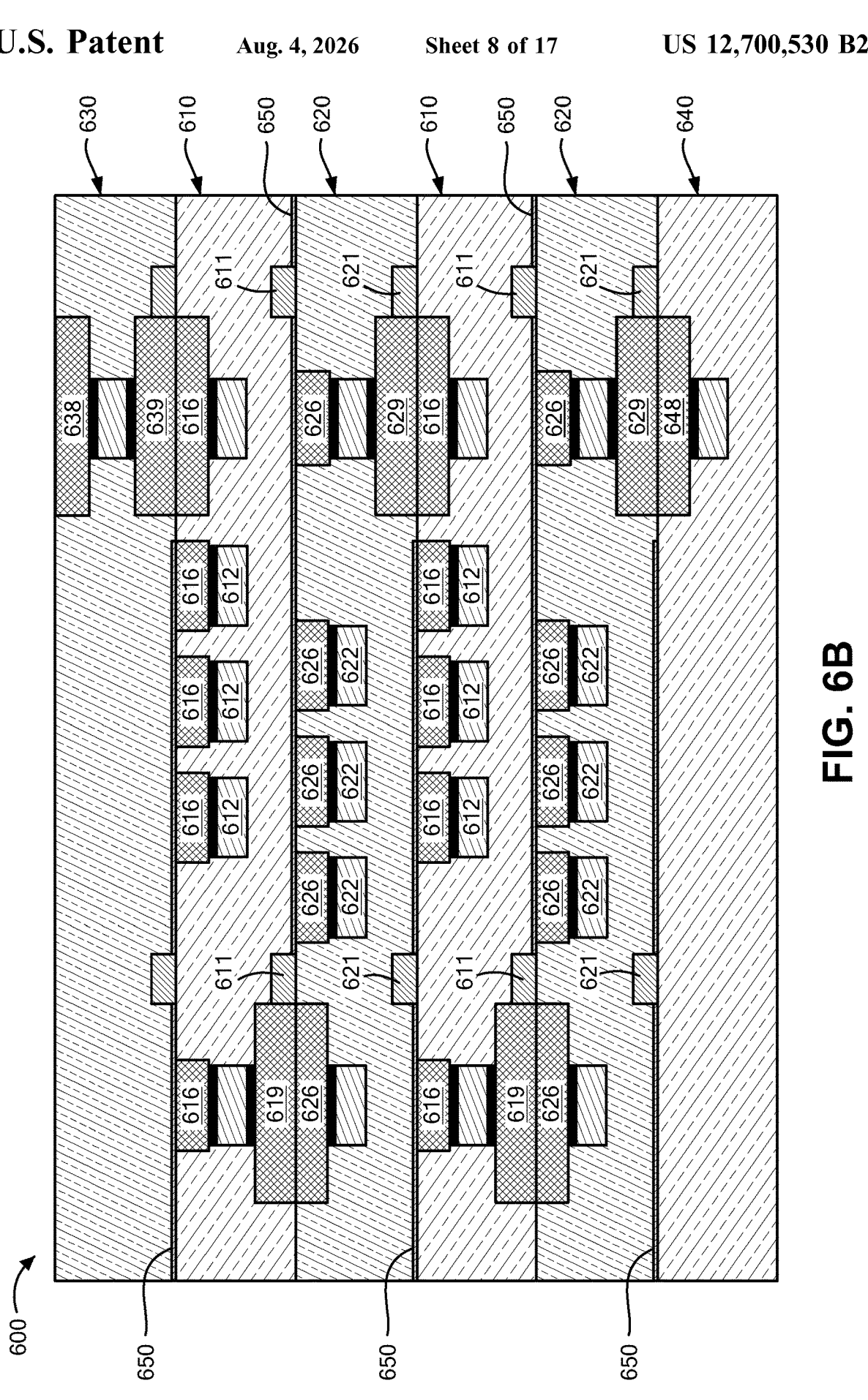

To illustrate a particular implementation of the improved magnet design represented by the coil 540, FIGS. 6A-6B show different cross-sections of an illustrative stack of plates in a NI superconducting magnet, according to some embodiments. Stack of plates 600 comprises two instances of plate 610 and two instances of plate 620, in addition to terminal plates 630 and 640. Layers of insulating material 650 are arranged at selected regions between neighboring plates.

The plates 610 and 620 include conductive channels in which the coil 540 is arranged, labeled in the example of FIGS. 6A-6B as a stack of HTS tapes 612 or 622, solder 614 or 624, and cap 616 or 626 for plates 610 and 620, respectively. The plates also include cooling channels 611, 621 and 631 which are arranged adjacent to the caps. The conductive material between turns of the coils is the baseplate material 610a, 620a, 630a and/or 640a in which the aforementioned channels are formed.

In the example of FIGS. 6A-6B, the conducting channel is arranged in a racetrack spiral (or simply "racetrack pattern"). In a racetrack spiral, the path follows a racetrack shape (e.g., a rectangle with rounded corners) without spiraling inward or outward for most of the circumference, but includes a number of "jogs" or "joggles" (i.e. portions of the path with curves and/or turns) in which the path jogs (or turns or curves) inward or outward. These jogs cause the racetrack spiral to wind inward or outward, depending on the direction of the jogs. FIG. 6A represents a cross-section of the stack of plates through the racetrack portion of the channels of the plates, whereas FIG. 6B represents a cross-section of the stack of plates in the region in which the conducting channels "jog" in or out to switch lanes of the racetrack spiral.

In the design of FIGS. 6A-6B, the open cooling channels in one plate may be arranged adjacent to the conducting channel of the neighboring plate. For example, as shown in FIG. 6A, which represents the racetrack portion of the channels, the cooling channels 611 in each instance of plate 610 are arranged adjacent to the cap 626 of the neighboring plate 620. Similarly, the cooling channels 621 in plate 620 are arranged adjacent to the cap 616, with cooling channels 631 arranged in the terminal cap 630 arranged adjacent to the uppermost instance of the plate 610.

It may be noted that cooling channels 621 in the lowermost instance of plate 620 are not strictly needed since there are no conductors adjacent to these channels. However, due to the modular nature of the plates in the stack 600, it may be more convenient to simply use an instance of plate 620 rather than fabricate a new type of plate that does not include the lowermost cooling channels 621.

In the example of FIGS. 6A-6B, the plates 610, 620, 630 and 640 are held together, at least in part, by bolts 680, which connect neighboring pairs of plates as shown in FIG. 6A. It may be presumed that such bolts are present at a number of locations around the plates 610, 620, 630 and 640, although the cross-section shown in FIG. 6B does not include any such bolts for clarity.

As shown in FIG. 6B, the plates may include conductive pads to connect the conductive paths in one plate to those of an adjacent plate. For example, the terminal plate 630 includes pad 639 which is adjacent to and electrically connected to the conductor 616 in the conducting channel of plate 610. Thus, the terminal plate may be adjacent to and electrically connected to one end of the conductive channel of plate 610, the other end of which is electrically connected to the pad 619. Pad 619 is, in turn, adjacent to and electrically connected to, the conductor 626 in the conducting channel of plate 620. The other end of the conductor 626 in the conducting channel of plate 620 is adjacent to and electrically connected to pad 629, which is adjacent to and electrically connected to the next plate 610, and so forth. In the example of FIG. 6B, the conductive pads 619, 629, 639 and 649 are shaded in the same manner as the caps of the plates, although it will be appreciated that in general the pads and caps need not comprise the same material(s).

According to some embodiments, insulating material 650 may comprise polyimide (e.g., Kapton®), epoxy resin, phenolic resin, glass epoxy laminate, a plastic, an elastomer, or combinations thereof. According to some embodiments, insulating material may have a breakdown voltage or dielectric strength of greater than 25 kV/mm, of greater than 50 kV/mm, of greater than 75 kV/mm, of greater than 1000 kV/mm. In some cases, the voltages in the superconducting magnet may be comparatively low, in which case a low voltage standoff insulating material such as anodized aluminum could be utilized as the insulating material 650.

According to some embodiments, the baseplates 610a, 620a, 630a and 640a may each comprise, or may consist of, a high mechanical strength material such as but not limited to steel, Inconel®, Nitronic® 40, Nitronic® 50, Incoloy®, or combinations thereof. In some embodiments, the baseplates 610a, 620a, 630a and 640a may be plated with a metal such as nickel to facilitate adhesion of other components of the plate, including solder.

In the example of FIGS. 6A, bolts 690 are arranged within through holes of the plates 610, 620, 630 and 640 and affix neighboring pairs of plates to one another.

To further illustrate the structure of a stack of plates such as those shown in FIGS. 6A-6B, FIGS. 7A-7D depict upper and lower views of individual plates 610 and 620.

Figure 7A:
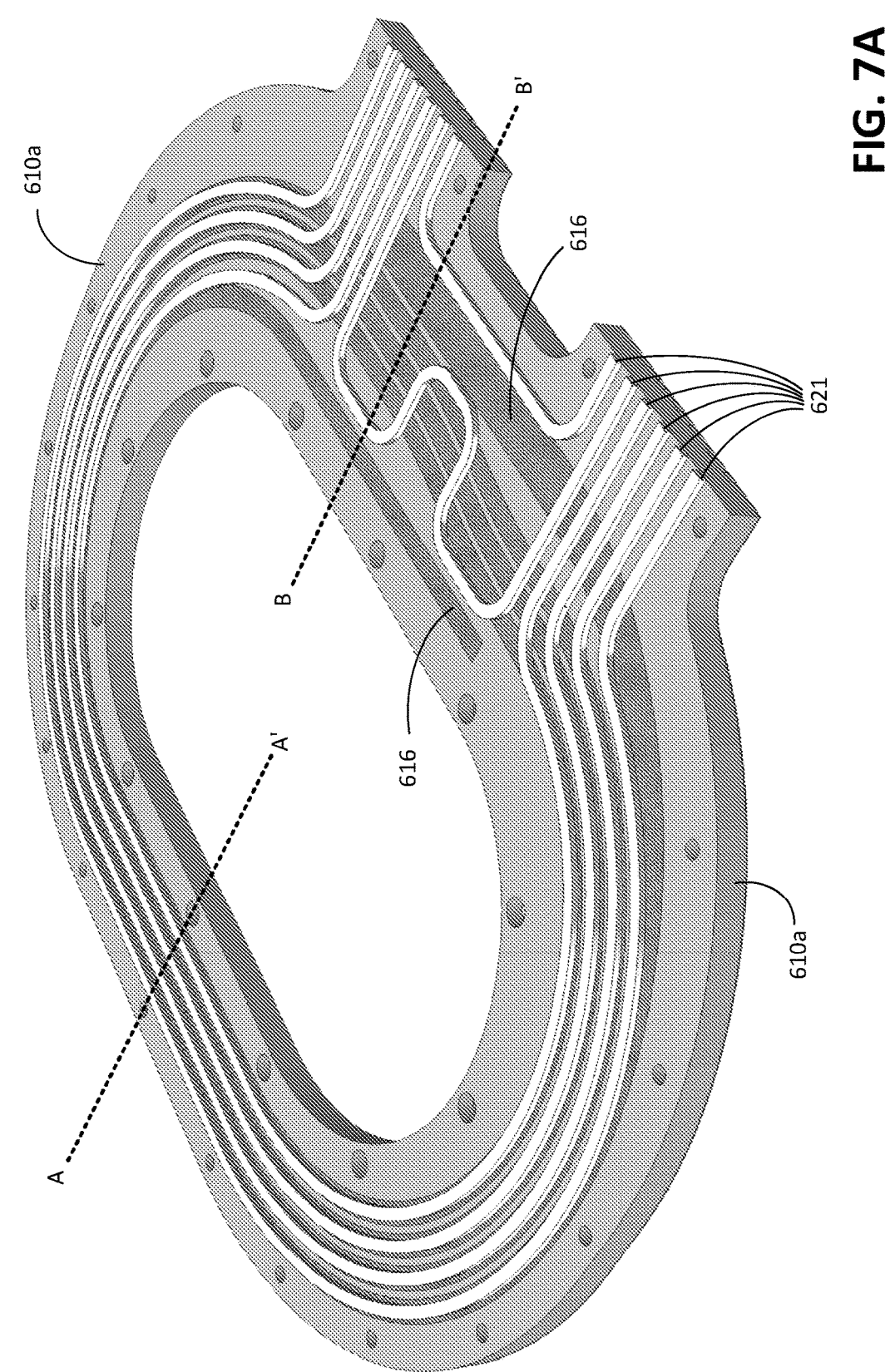
FIGS. 7A-7B are perspective views of opposing surfaces of an illustrative individual plate of the type which may be included in a stack of plates in a superconducting magnet, according to some embodiments.
Figure 7B:
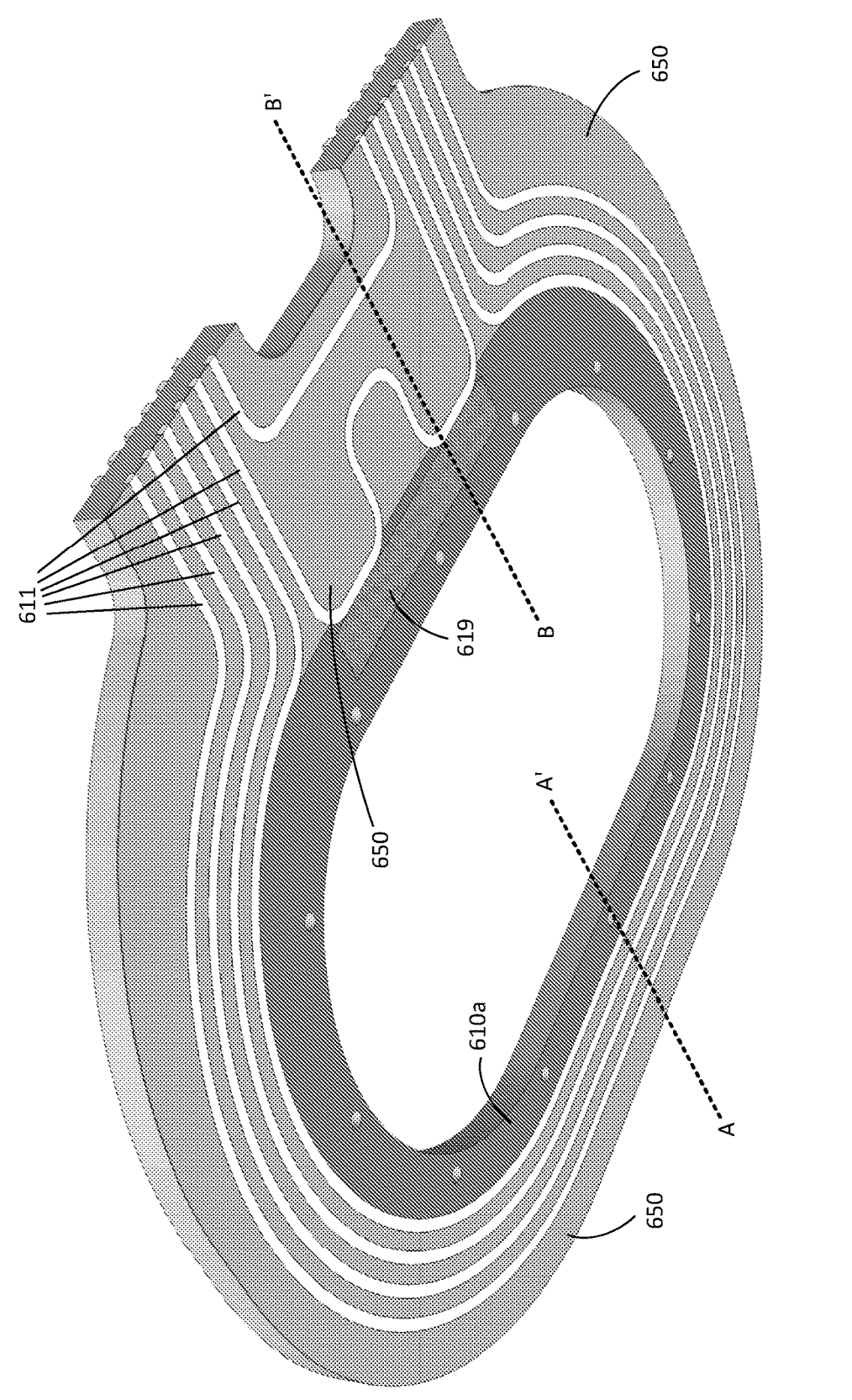

FIGS. 7A and 7B depict upper and lower views, respectively, of plate 610, wherein the cross-section of FIG. 6A is through the section marked A-A' and the cross-section of FIG. 6B is through the section marked B-B'. In the example of FIGS. 7A-7B, the location of cooling channels 621, which are part of plate 620 arranged above the plate 610, are shown for purposes of explanation, although it will be appreciated that these cooling channels are not in fact part of the plate 610. As may be noted, the conducting channel of plate 610 in this example has an inward spiral when following the channel in a clockwise direction viewed from above.

As may be seen in FIG. 7A, for the bulk of the racetrack sections of the conducting channel of the plate 610—of which the cap 616 is visible—the cooling channels 621 of the neighboring plate 620 are aligned with the conducting channel. As such, cryogen passing through the cooling channels may directly contact the cap 616 and deliver cooling to the HTS material arranged beneath the cap as discussed above.

The region of the plate 610 between the coolant inlet and outlet (the two regions where the coolant channels meet the edge of the plate) includes, in the example of FIG. 7A, a "meandering" region of the cooling channel 621 that meanders back and forth over the conducting channels 616. Various other arrangements may be envisioned, including a cooling channel that is aligned with a single conducting channel, but runs back and forth over successive cooling channels in the region between the inlet and outlet.

Figure 12B:
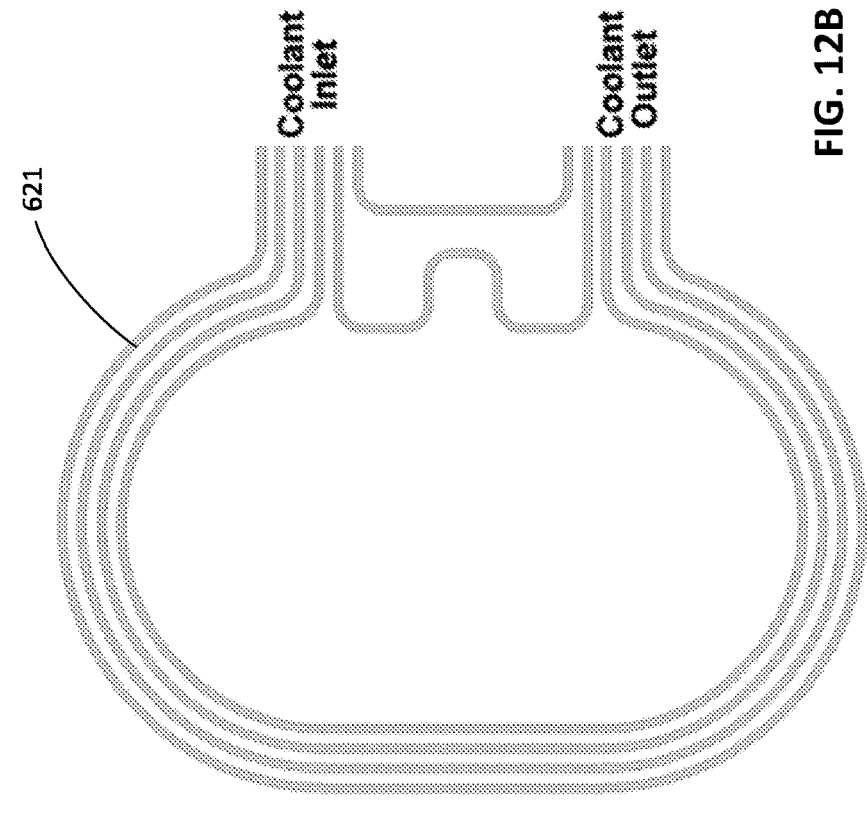
FIGS. 12A, 12B are top views of illustrative coolant channels appropriate for use in a NI superconducting magnet, according to some embodiments.
Figure 12A:
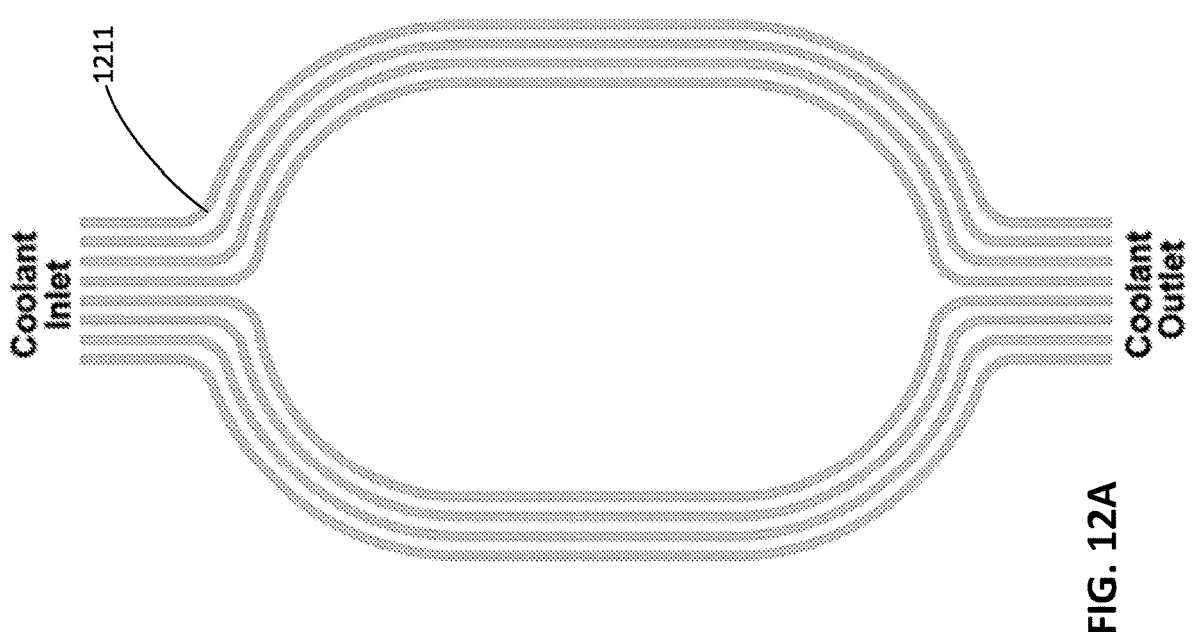

In some embodiments, the inlet and outlet regions of the plate may be further apart than is shown in the example of FIG. 7A, such as at opposite ends of the plate from one another. In such cases, the cooling channels may be arranged so that some cooling channels (e.g., half) pass along one side of the plate with the other cooling channels passing along the other side of the plate. An example of such a cooling channel configuration is depicted in FIG. 12A, which shows a single layer of cooling channels 1211 in an aerial view. FIG. 12B depicts the cooling channels 621 of the layer of the plate shown in FIG. 7A with the same aerial view for comparison. It may be noted that alternative cooling channel arrangements such as that shown in FIG. 12A may be arranged on a plate without altering the structure of the other elements of the plate except for the portion(s) of the baseplate that connect the cooling channels to the edge of the plate. For instance, as shown in FIG. 3A the cooling channels may be arranged as shown in FIG. 12A without altering the conductive channels of the plate.

FIG. 7B illustrates the underside of plate 610, and includes portions to which insulating material 650 is attached, and portions for which the baseplate 610a is exposed.

Figure 7C:
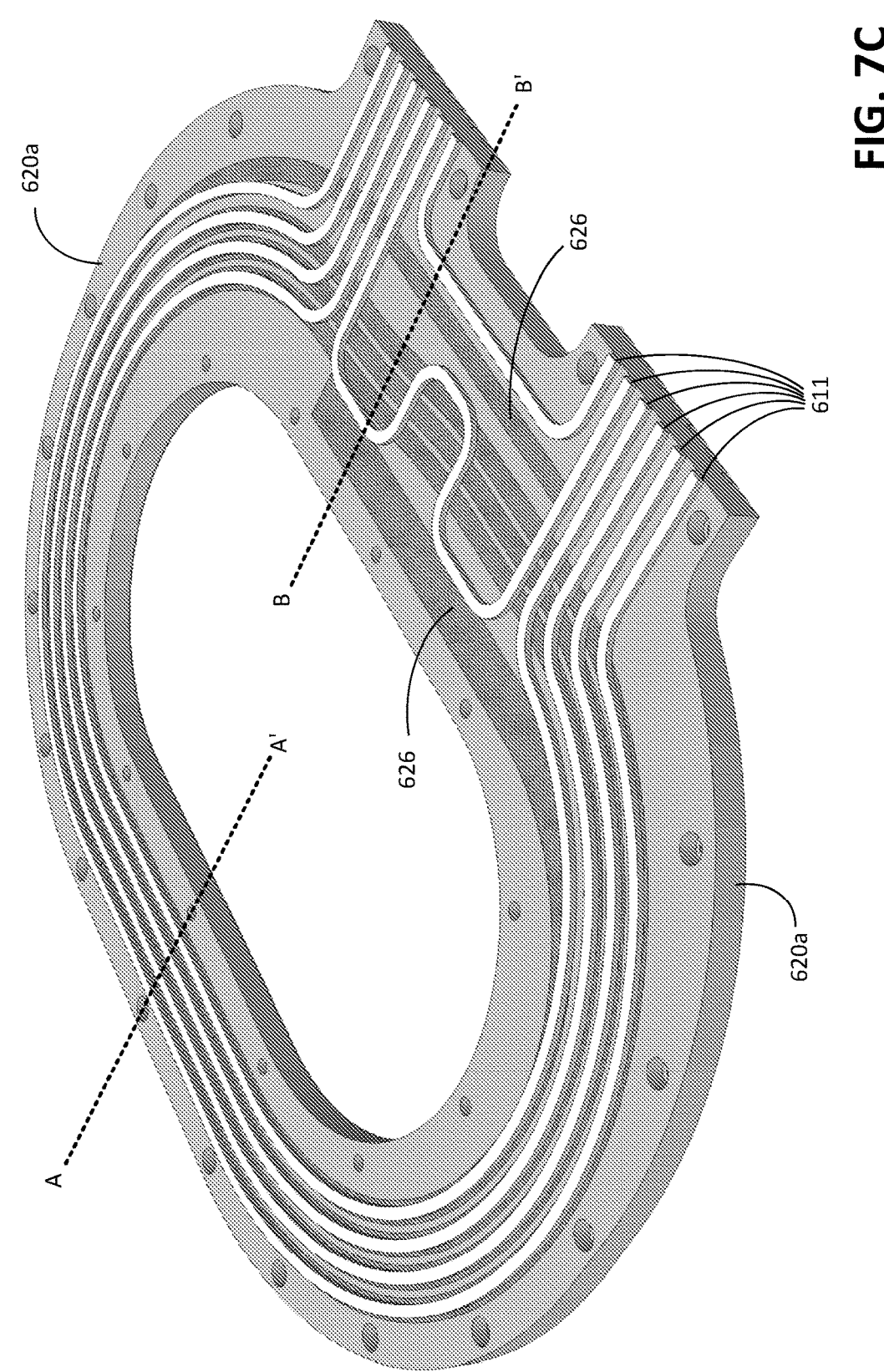
FIGS. 7C-7D are perspective views of opposing surfaces of an illustrative individual plate of the type which may be included in a stack of plates in a superconducting magnet, according to some embodiments.
Figure 7D:
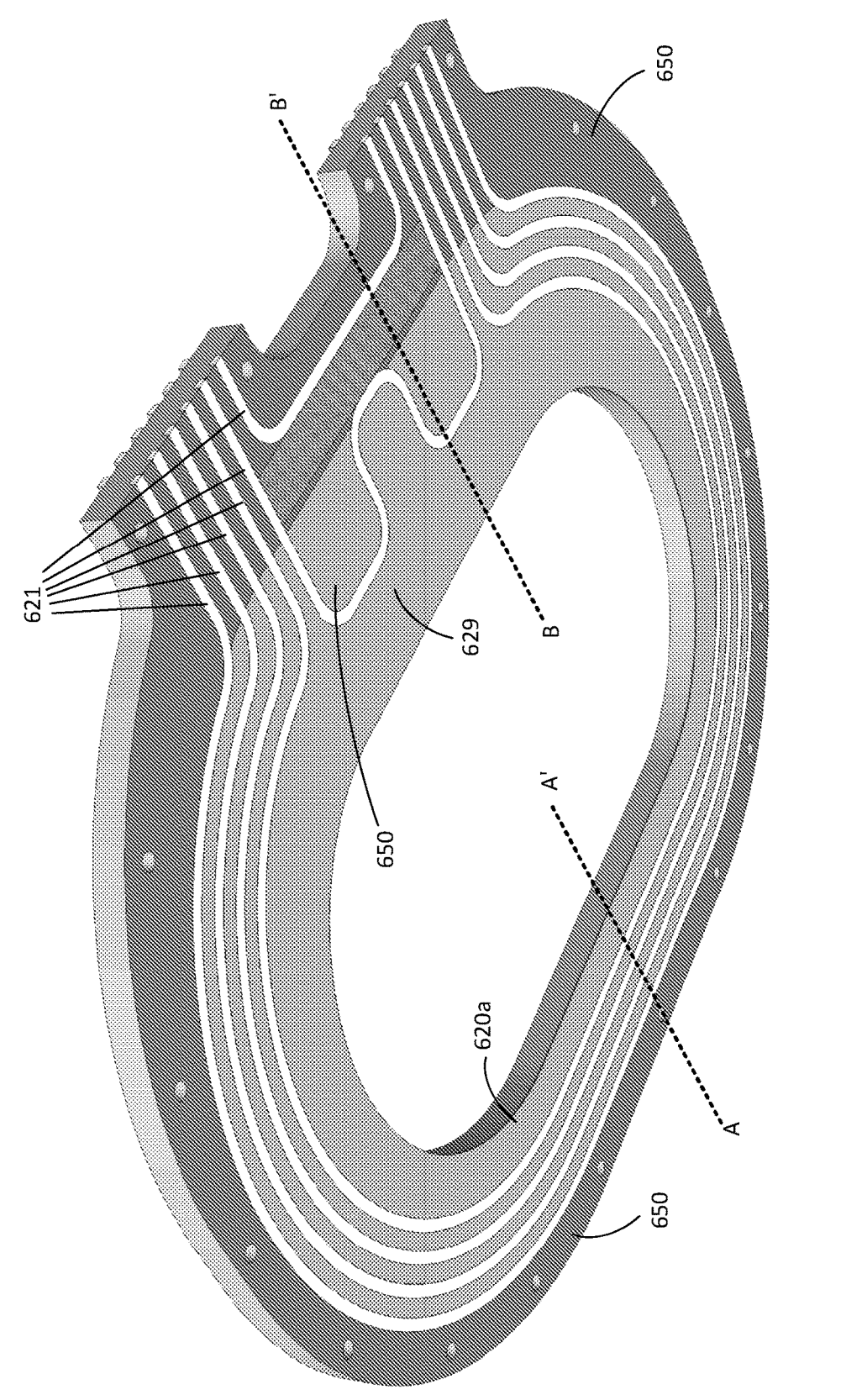

FIGS. 7C and 7D depict upper and lower views, respectively, of plate 620, wherein the cross-section of FIG. 6A is through the section marked A-A' and the cross-section of FIG. 6B is through the section marked B-B'. In the example of FIGS. 7C-7D, the location of cooling channels 611, which are part of plate 610 arranged above the plate 620, are shown for purposes of explanation, although it will be appreciated that these cooling channels are not in fact part of the plate 620. As may be noted, the conducting channel of plate 620 in this example has an outward spiral when following the channel in a clockwise direction viewed from above.

As may be seen in FIG. 7C, for the bulk of the racetrack sections of the conducting channel of the plate 620—of which the cap 626 is visible—the cooling channels 611 of the neighboring plate 610 are aligned with the conducting channel. As such, cryogen passing through the cooling channels may directly contact the cap 626 and deliver cooling to the HTS material arranged beneath the cap as discussed above.

The region of the plate 620 between the coolant inlet and outlet (the two regions where the coolant channels meet the edge of the plate) includes, in the example of FIG. 7C, a "meandering" region of the cooling channel 611 that meanders back and forth over the conducting channels 626. Various other arrangements may be envisioned, including a cooling channel that is aligned with a single conducting channel, but runs back and forth over successive cooling channels in the region between the inlet and outlet.

In some embodiments, the inlet and outlet regions of the plate may be further apart than is shown in the example of FIG. 7C, such as at opposite ends of the plate from one another. In such cases, the cooling channels may be arranged so that some cooling channels (e.g., half) pass along one side of the plate with the other cooling channels passing along the other side of the plate.

FIG. 7D illustrates the underside of plate 620, and includes portions to which insulating material 650 is attached, and portions for which the baseplate 620a is exposed.

Figure 8:
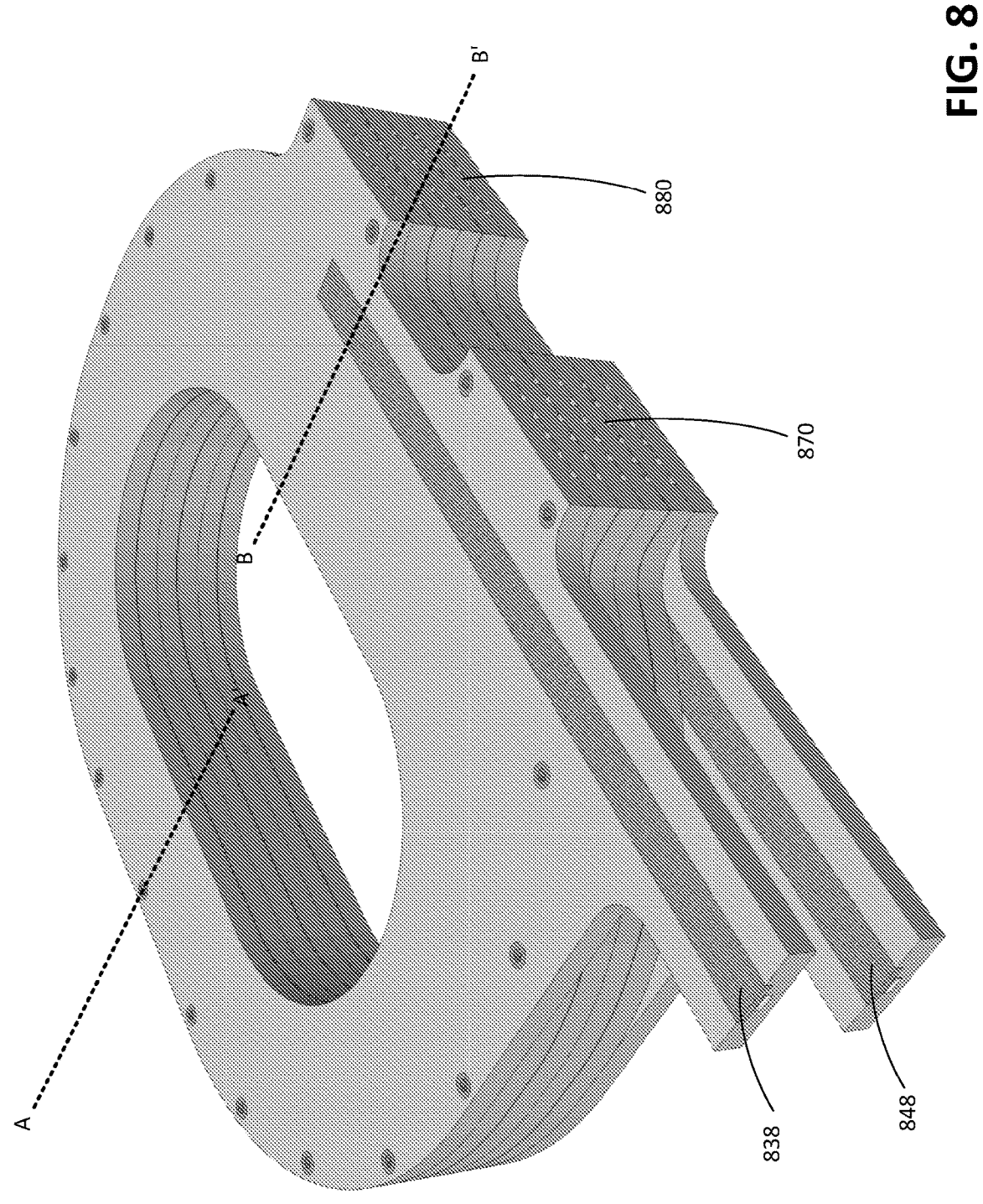
FIG. 8 is a perspective view of an illustrative stack of plates of a superconducting magnet, according to some embodiments.

FIG. 8 is a perspective view of an illustrative stack of plates of a superconducting magnet, according to some embodiments. Stack of plates 800 represents an exterior perspective view of the stack of plates shown in cross-section in FIGS. 6A-6B. As in FIGS. 7A-7D, the cross-section of FIG. 6A is through the section marked A-A' and the cross-section of FIG. 6B is through the section marked B-B'.

Figure 9:
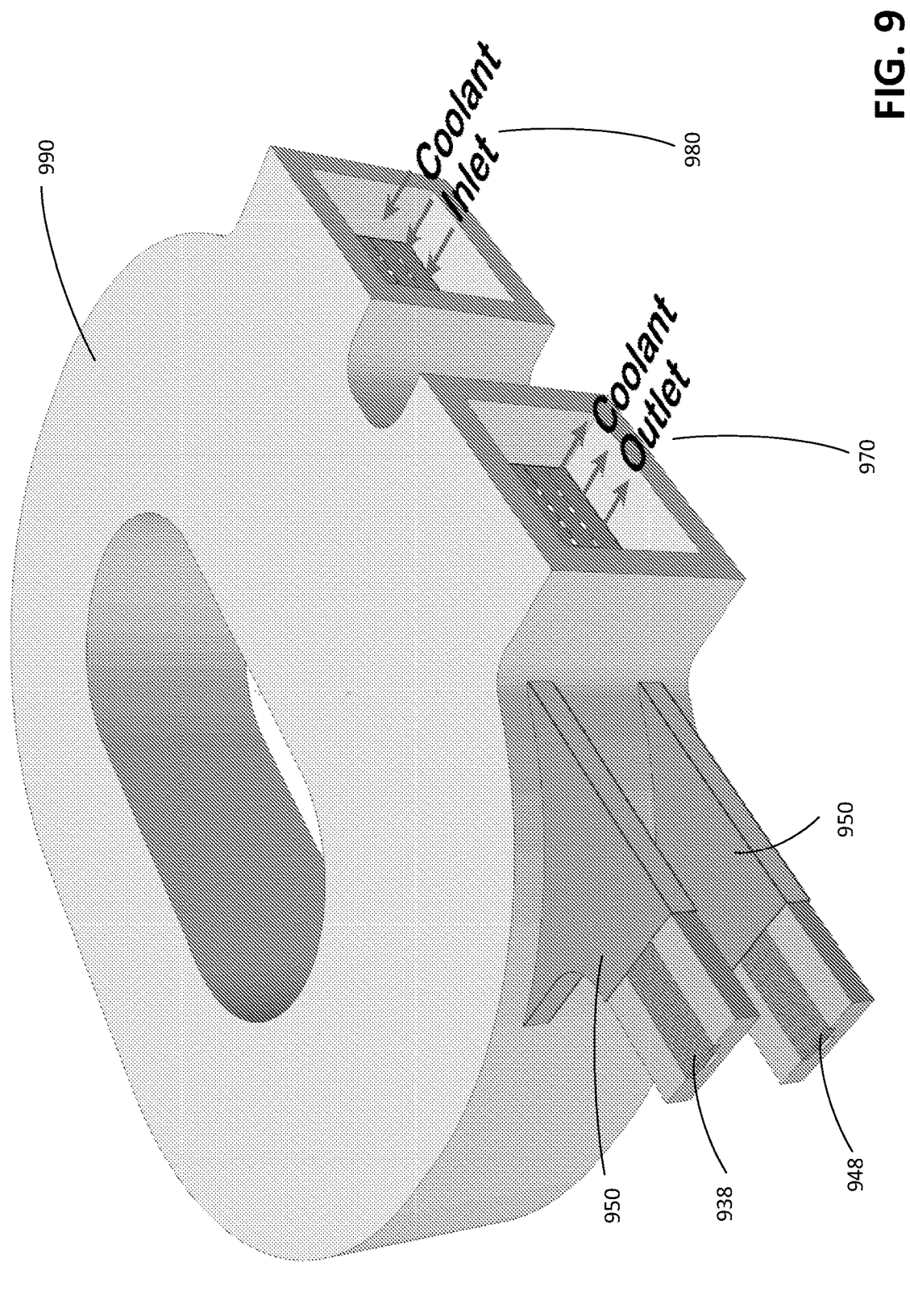
FIG. 9 is a perspective view of an illustrative stack of plates of a superconducting magnet with an exterior case, according to some embodiments.

As shown in the example of FIG. 8, the terminal plates at the top and the bottom of the stack each comprise a conductive portion 838 and 848, respectively, that extends outward from the stack and that are electrically connected to one another through the spiral conducting paths within the stack. Each cooling channel of the plates of the stack terminates at a common set of ports 870 at one end of the channel and at a common set of ports 880 at the other end of the channel. Since the ends of the cooling channels are arranged together, with all the inlets together and all the outlets together, a single large inlet or outlet port may be formed around the set of channels at each end, as shown in FIG. 9. This may allow coolant to pass through all the cooling channels of the stack of plates using just a single inlet pipe and a single outlet pipe.

FIG. 9 is a perspective view of an illustrative stack of plates of a superconducting magnet with an exterior case, according to some embodiments. Subsequent to assembly of the stack of plates, some or all of the exterior of the stack may be wrapped in an insulating material. In the example of FIG. 9, the entire stack of plates except for the cooling inlet and outlet 970 and 980, and the ends of the terminal plates that include conductive portions 928 and 948, are wrapped in an insulating material 950 such as polyimide (e.g., Kapton®), epoxy resin, phenolic resin, glass epoxy laminate, a plastic, an elastomer, or combinations thereof. According to some embodiments, the insulating material 950 may have a breakdown voltage or dielectric strength of greater than 25 kV/mm, of greater than 50 kV/mm, of greater than 75 kV/mm, of greater than 1000 kV/mm. In some cases, the voltages in the superconducting magnet may be comparatively low, in which case a low voltage standoff insulating material such as anodized aluminum could be utilized as the insulating material 950.

Subsequent to application of the insulating material 950, the stack of plates are enclosed within a case 990, which provides further structural stability to the stack of plates and may comprise fiberglass, for instance.

As noted above, in some situations in which the HTS material is provided as an HTS tape, it may be desirable to vary the number of HTS conductors in a stack of co-wound HTS tapes according to their location within the magnet, thereby reducing the total amount of HTS tape needed to construct the magnet and controlling the value of $R_N$ to be different for different turns of the coil.

Figure 10:
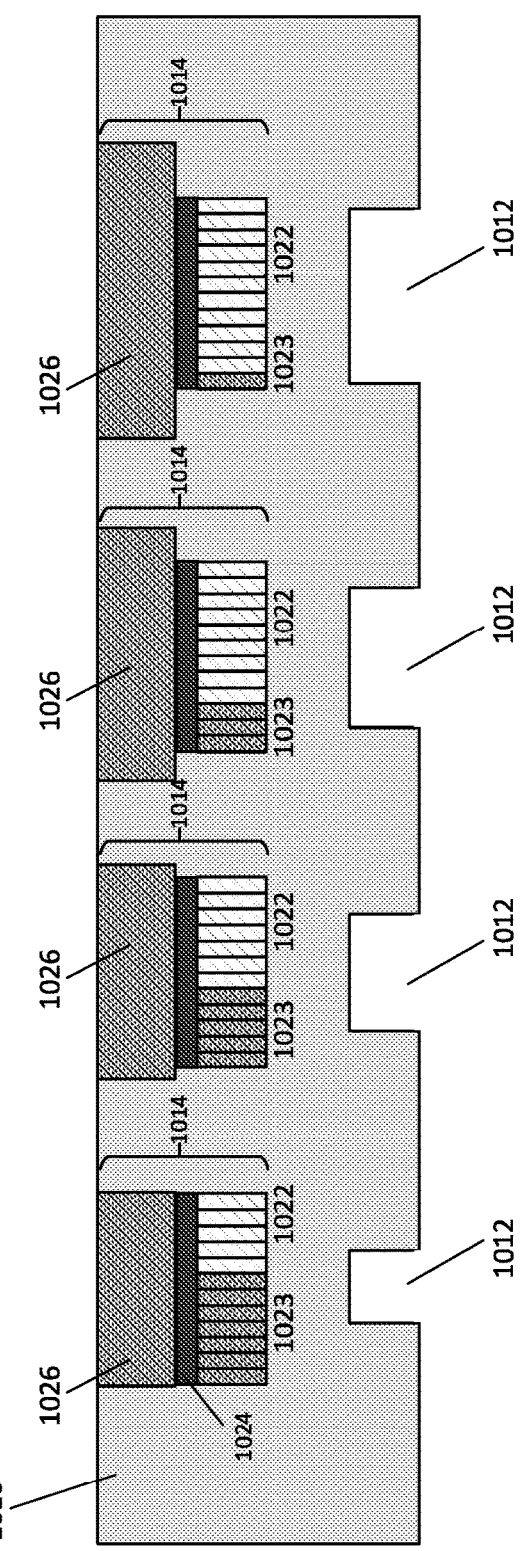
FIG. 10 is a cross-sectional view of an illustrative plate in which the conducting channels comprise a stack of co-wound HTS tapes in addition to conductive co-wound tape, according to some embodiments.

FIG. 10 illustrates an example of one of the plates of the magnet design of FIGS. 6A-6B in which the conducting channels 1014 comprise a stack of co-wound HTS tapes 1022 in addition to conductive co-wound tape 1023 (e.g., copper tape). As may be noted from FIG. 10, the number of HTS tapes is decreased in each turn going from right to left in FIG. 10, while the number of conductive co-wound tapes is increased right-to-left. The width of the cap 1026 is varied in conjunction with number of conductive co-wound tapes such that their combined cross-sectional area is roughly constant in every turn. In this way, the resistance per unit length of the co-conductor is maintained constant throughout the winding pack.

Tuning the amount of HTS tape 1022, co-wound conductive tape 1023, and the size of the cap 1026 may provide a way to control the rate of magnetic energy dissipation during a quench, and in some cases may dissipate the magnetic energy uniformly throughout the winding pack during a full magnet quench event. In addition, tuning the amount of HTS tape 1022, co-wound conductive tape 1023, and the size of the cap 1026 may alter an amount of magnetic energy deposition in adjacent areas. This may allow, for instance, reduction of the magnetic energy deposition in critical areas such as in regions with joints.

Figure 11:
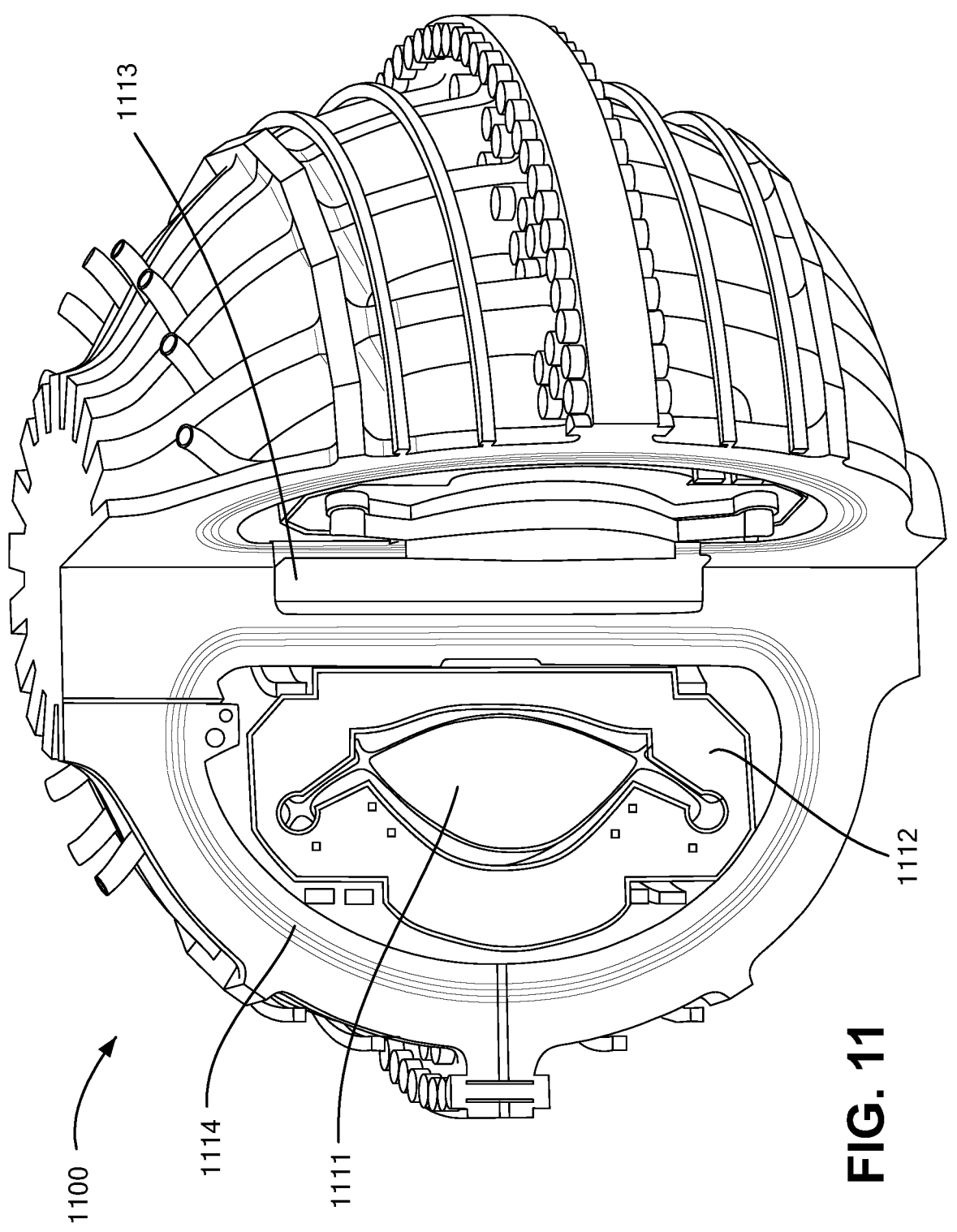
FIG. 11 is a perspective view of a fusion power plant with a cutaway portion to reveal various illustrative components of the power plant, according to some embodiments.

FIG. 11 is a three-dimensional graphic of a fusion power plant with a cutaway portion illustrating various components of the power plant, according to some embodiments. A magnet within a fusion power plant may be formed from a superconductor arrangement as described above. FIG. 11 shows a cross-section through a power plant and includes a magnet coil 1114, which is fabricated from, or otherwise includes, a superconducting magnet comprising a stack of plates as discussed and described above, a neutron shield 1112, and a core region 1111. According to some embodiments, the magnet coil 1114 may be, or may form part of, a toroidal field coil. Magnet coil 1113 may be fabricated from, or otherwise includes, a superconducting magnet comprising a stack of plates as discussed and described above. According to some embodiments, the magnet coil 1113 may be, or may form part of a central solenoid and/or other poloidal field solenoidal coils.

Persons having ordinary skill in the art may appreciate other embodiments of the concepts, results, and techniques disclosed herein. It is appreciated that superconducting cables configured according to the concepts and techniques described herein may be useful for a wide variety of applications, including applications in which the superconducting cable is wound into a coil to form a magnet. For instance, one such application is conducting nuclear magnetic resonance (NMR) research into, for example, solid state physics, physiology, or proteins, for which such cables may be wound into a magnet. Another application is performing clinical magnetic resonance imaging (MRI) for medical scanning of an organism or a portion thereof, for which compact, high-field magnets are needed. Yet another application is high-field MM, for which large bore solenoids are required. Still another application is for performing magnetic research in physics, chemistry, and materials science. Further applications is in magnets for particle accelerators for materials processing or interrogation; electrical power generators; medical accelerators for proton therapy, radiation therapy, and radiation generation generally; superconducting energy storage; magnetohydrodynamic (MHD) electrical generators; and material separation, such as mining, semiconductor fabrication, and recycling. It is appreciated that the above list of applications is not exhaustive, and there are further applications to which the concepts, processes, and techniques disclosed herein may be put without deviating from their scope.

As used herein, a "high temperature superconductor" or "HTS" refers to a material that has a critical temperature above 30 K, wherein the critical temperature refers to the temperature below which the electrical resistivity of the material drops to zero.

Illustrative examples of conducting channels and cooling channels are described herein and illustrated in the drawings. It will be appreciated that the particular size and shape of these channels are provided merely as examples and that no particular cross-sectional shape or size is implied as being necessary or desirable unless otherwise noted.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A magnet comprising:
a plurality of plates arranged in a stack that includes a first plate, the first plate comprising a conducting channel on a first side of the first plate, at least part of the conducting channel being arranged in a spiral path, the conducting channel comprising a coil comprising a plurality of windings of a non-insulated wire, the non-insulated wire comprising:
a stack of high temperature superconductor (HTS) tapes, wherein each of the HTS tapes comprises an HTS material and is surrounded by a cladding comprising a conductive material;
a co-conductor layer comprising a conductive cap; and
a layer of solder arranged between and in contact with the stack of HTS tapes and the conductive cap,
wherein the stack of HTS tapes is arranged within the conducting channel, the layer of solder is arranged over the stack of HTS tapes within the conducting channel, and wherein the conductive cap is arranged over the stack of HTS tapes and the layer of solder in the conducting channel such that the co-conductor layer caps the stack of HTS tapes within the conducting channel.

2. The magnet of claim 1, wherein a ratio between a thickness of the co-conductor layer and a thickness of the stack of HTS tapes is between 0.5 and 2.

3. The magnet of claim 1, wherein a ratio between a thickness of the co-conductor layer and a thickness of the stack of HTS tapes is between 0.2 and 5.

4. The magnet of claim 1, wherein a ratio between a cross-sectional area of the co-conductor layer and a cross-sectional area of the stack of HTS tapes is between 0.2 and 5.

5. The magnet of claim 1, wherein the plurality of windings of the non-insulated wire are wound around an axis aligned in a first direction, and wherein the HTS tapes of the stack of HTS tapes are stacked radially with respect to the axis.

6. The magnet of claim 5, wherein the co-conductor layer is arranged over the stack of HTS tapes along the first direction.

7. The magnet of claim 1, wherein the HTS material comprises a rare earth barium copper oxide (REBCO) material.

8. The magnet of claim 1, wherein at least one of the co-conductive layer or the conductive material comprises copper.

9. The magnet of claim 1, wherein the conductive material comprises copper.

10. The magnet of claim 1, wherein the first plate further comprises a plurality of cooling channels on a second side of the first plate, the second side opposing the first side.

11. The magnet of claim 10, wherein the first plate is formed from a first material in which the plurality of cooling channels and the conducting channel are formed, and wherein the first material comprises steel.

12. The magnet of claim 1, wherein the HTS material comprises a superconductor layer comprising a substrate, one or more buffer layers, and an HTS superconducting material, and wherein a ratio of a cross-sectional area of the conductive material to a cross-sectional area of the superconductor layer is at least 0.75.

13. The magnet of claim 12, wherein the ratio between the cross-sectional area of the conductive material and the cross-sectional area of the superconductor layer is between 1.0 and 4.0.

14. The magnet of claim 12, wherein the ratio between the cross-sectional area of the conductive material and the cross-sectional area of the superconductor layer is at least 2.0.

15. The magnet of claim 14, wherein the ratio between the cross-sectional area of the conductive material to the cross-sectional area of the superconductor layer is between 2.0 and 4.0.

16. The magnet of claim 1, wherein the co-conductor layer comprises a stack of conductive non-superconductor tapes.

* * * * *